United States Patent
Peso Parada et al.

(10) Patent No.: US 11,692,889 B2
(45) Date of Patent: Jul. 4, 2023

(54) CONTROL METHODS FOR A FORCE SENSOR SYSTEM

(71) Applicant: Cirrus Logic International Semiconductor Ltd., Edinburgh (GB)

(72) Inventors: Pablo Peso Parada, Edinburgh (GB); Hamid Sepehr, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/735,582

(22) Filed: May 3, 2022

(65) Prior Publication Data

US 2022/0260439 A1 Aug. 18, 2022

Related U.S. Application Data

(63) Continuation of application No. 16/850,117, filed on Apr. 16, 2020, now Pat. No. 11,408,787.

(60) Provisional application No. 62/915,245, filed on Oct. 15, 2019.

(51) Int. Cl.
| | |
|---|---|
| *G01L 5/00* | (2006.01) |
| *G01L 25/00* | (2006.01) |
| *G06F 3/03* | (2006.01) |
| *G01L 1/22* | (2006.01) |
| *G01K 3/00* | (2006.01) |

(52) U.S. Cl.
CPC ............ *G01L 5/0038* (2013.01); *G01K 3/005* (2013.01); *G01L 1/22* (2013.01); *G01L 25/00* (2013.01); *G06F 3/03* (2013.01)

(58) Field of Classification Search
CPC ......... G01L 5/0038; G01L 1/142; G01L 1/16; G01L 1/18; G01L 1/22; G01L 25/00; G01K 3/005; G01F 3/016; G06F 3/03
See application file for complete search history.

(56) References Cited

U.S. PATENT DOCUMENTS

| | | |
|---|---|---|
| 3,686,927 A | 8/1972 | Scharton |
| 4,902,136 A | 2/1990 | Mueller et al. |
| 5,374,896 A | 12/1994 | Sato et al. |
| 5,684,722 A | 11/1997 | Thorner et al. |
| 5,748,578 A | 5/1998 | Schell |
| 5,857,986 A | 1/1999 | Moriyasu |
| 6,050,393 A | 4/2000 | Murai et al. |
| 6,278,790 B1 | 8/2001 | Davis et al. |

(Continued)

FOREIGN PATENT DOCUMENTS

| | | |
|---|---|---|
| AU | 2002347829 | 4/2003 |
| CN | 103165328 A | 6/2013 |

(Continued)

OTHER PUBLICATIONS

Invitation to Pay Additional Fees, Partial International Search Report and Provisional Opinion of the International Searching Authority, International Application No. PCT/US2020/052537, dated Jan. 14, 2021.

(Continued)

*Primary Examiner* — Octavia Davis Hollington
(74) *Attorney, Agent, or Firm* — Jackson Walker L.L.P.

(57) ABSTRACT

A method of controlling a force sensor system to define at least one button implemented by at least one force sensor, the method comprising: receiving a force sensor input; determining a gradient of the force sensor input; and controlling the force sensor system based on the determined gradient.

19 Claims, 15 Drawing Sheets

(56) References Cited

U.S. PATENT DOCUMENTS

| | | |
|---|---|---|
| 6,294,891 B1 | 9/2001 | McConnell et al. |
| 6,332,029 B1 | 12/2001 | Azima et al. |
| 6,388,520 B2 | 5/2002 | Wada et al. |
| 6,567,478 B2 | 5/2003 | Oishi et al. |
| 6,580,796 B1 | 6/2003 | Kuroki |
| 6,683,437 B2 | 1/2004 | Tierling |
| 6,703,550 B2 | 3/2004 | Chu |
| 6,762,745 B1 | 7/2004 | Braun et al. |
| 6,768,779 B1 | 7/2004 | Nielsen |
| 6,784,740 B1 | 8/2004 | Tabatabaei |
| 6,816,833 B1 | 11/2004 | Iwamoto et al. |
| 6,906,697 B2 | 6/2005 | Rosenberg |
| 6,995,747 B2 | 2/2006 | Casebolt et al. |
| 7,042,286 B2 | 5/2006 | Meade et al. |
| 7,154,470 B2 | 12/2006 | Tierling |
| 7,277,678 B2 | 10/2007 | Rozenblit et al. |
| 7,333,604 B2 | 2/2008 | Zernovizky et al. |
| 7,392,066 B2 | 6/2008 | Haparnas |
| 7,456,688 B2 | 11/2008 | Okazaki et al. |
| 7,623,114 B2 | 11/2009 | Rank |
| 7,639,232 B2 | 12/2009 | Grant et al. |
| 7,777,566 B1 | 8/2010 | Drogi et al. |
| 7,791,588 B2 | 9/2010 | Tierling et al. |
| 7,825,838 B1 | 11/2010 | Srinivas et al. |
| 7,979,146 B2 | 7/2011 | Ullrich et al. |
| 8,068,025 B2 | 11/2011 | Devenyi et al. |
| 8,098,234 B2 | 1/2012 | Lacroix et al. |
| 8,102,364 B2 | 1/2012 | Tierling |
| 8,325,144 B1 | 12/2012 | Tierling et al. |
| 8,427,286 B2 | 4/2013 | Grant et al. |
| 8,441,444 B2 | 5/2013 | Moore et al. |
| 8,466,778 B2 | 6/2013 | Hwang et al. |
| 8,480,240 B2 | 7/2013 | Kashiyama |
| 8,572,293 B2 | 10/2013 | Cruz-Hernandez et al. |
| 8,572,296 B2 | 10/2013 | Shasha et al. |
| 8,593,269 B2 | 11/2013 | Grant et al. |
| 8,648,659 B2 | 2/2014 | Oh et al. |
| 8,648,829 B2 | 2/2014 | Shahoian et al. |
| 8,659,208 B1 | 2/2014 | Rose et al. |
| 8,754,757 B1 | 6/2014 | Ullrich et al. |
| 8,754,758 B1 | 6/2014 | Ullrich et al. |
| 8,947,216 B2 | 2/2015 | Da Costa et al. |
| 8,981,915 B2 | 3/2015 | Birnbaum et al. |
| 8,994,518 B2 | 3/2015 | Gregorio et al. |
| 9,019,087 B2 | 4/2015 | Bakircioglu et al. |
| 9,030,428 B2 | 5/2015 | Fleming |
| 9,063,570 B2 | 6/2015 | Weddle et al. |
| 9,070,856 B1 | 6/2015 | Rose et al. |
| 9,083,821 B2 | 7/2015 | Hughes |
| 9,092,059 B2 | 7/2015 | Bhatia |
| 9,117,347 B2 | 8/2015 | Matthews |
| 9,128,523 B2 | 9/2015 | Buuck et al. |
| 9,164,587 B2 | 10/2015 | Da Costa et al. |
| 9,196,135 B2 | 11/2015 | Shah et al. |
| 9,248,840 B2 | 2/2016 | Truong |
| 9,326,066 B2 | 4/2016 | Kilppel |
| 9,329,721 B1 | 5/2016 | Buuck et al. |
| 9,354,704 B2 | 5/2016 | Lacroix et al. |
| 9,368,005 B2 | 6/2016 | Cruz-Hernandez et al. |
| 9,489,047 B2 | 11/2016 | Jiang et al. |
| 9,495,013 B2 | 11/2016 | Underkoffler et al. |
| 9,507,423 B2 | 11/2016 | Gandhi et al. |
| 9,513,709 B2 | 12/2016 | Gregorio et al. |
| 9,520,036 B1 | 12/2016 | Buuck |
| 9,588,586 B2 | 3/2017 | Rihn |
| 9,640,047 B2 | 5/2017 | Choi et al. |
| 9,652,041 B2 | 5/2017 | Jiang et al. |
| 9,696,859 B1 | 7/2017 | Heller et al. |
| 9,697,450 B1 | 7/2017 | Lee |
| 9,715,300 B2 | 7/2017 | Sinclair et al. |
| 9,740,381 B1 | 8/2017 | Chaudhri et al. |
| 9,842,476 B2 | 12/2017 | Rihn et al. |
| 9,864,567 B2 | 1/2018 | Seo |
| 9,881,467 B2 | 1/2018 | Levesque |
| 9,886,829 B2 | 2/2018 | Levesque |
| 9,946,348 B2 | 4/2018 | Ullrich et al. |
| 9,947,186 B2 | 4/2018 | Macours |
| 9,959,744 B2 | 5/2018 | Koskan et al. |
| 9,965,092 B2 | 5/2018 | Smith |
| 10,032,550 B1 | 7/2018 | Zhang et al. |
| 10,039,080 B2 | 7/2018 | Miller et al. |
| 10,055,950 B2 | 8/2018 | Saboune et al. |
| 10,074,246 B2 | 9/2018 | Da Costa et al. |
| 10,102,722 B2 | 10/2018 | Levesque et al. |
| 10,110,152 B1 | 10/2018 | Hajati |
| 10,171,008 B2 | 1/2019 | Nishitani et al. |
| 10,175,763 B2 | 1/2019 | Shah |
| 10,191,579 B2 | 1/2019 | Forlines et al. |
| 10,264,348 B1 | 4/2019 | Harris et al. |
| 10,275,087 B1 | 4/2019 | Smith |
| 10,402,031 B2 | 9/2019 | Vandermeijden et al. |
| 10,564,727 B2 | 2/2020 | Billington et al. |
| 10,620,704 B2 | 4/2020 | Rand et al. |
| 10,667,051 B2 | 5/2020 | Stahl |
| 10,726,683 B1 | 7/2020 | Mondello et al. |
| 10,735,956 B2 | 8/2020 | Bae et al. |
| 10,782,785 B2 | 9/2020 | Hu et al. |
| 10,795,443 B2 | 10/2020 | Hu et al. |
| 10,820,100 B2 | 10/2020 | Stahl et al. |
| 10,828,672 B2 | 11/2020 | Stahl et al. |
| 10,832,537 B2 | 11/2020 | Doy et al. |
| 10,848,886 B2 | 11/2020 | Rand |
| 10,860,202 B2 | 12/2020 | Sepehr et al. |
| 10,955,955 B2 | 3/2021 | Peso Parada et al. |
| 10,969,871 B2 | 4/2021 | Rand et al. |
| 10,976,825 B2 | 4/2021 | Das et al. |
| 11,069,206 B2 | 7/2021 | Rao et al. |
| 11,079,874 B2 | 8/2021 | Lapointe et al. |
| 11,139,767 B2 | 10/2021 | Janko et al. |
| 11,150,733 B2 | 10/2021 | Das et al. |
| 11,259,121 B2 | 2/2022 | Lindemann et al. |
| 11,460,526 B1 * | 10/2022 | Foo .............. G01R 33/543 |
| 2001/0043714 A1 | 11/2001 | Asada et al. |
| 2002/0018578 A1 | 2/2002 | Burton |
| 2002/0085647 A1 | 7/2002 | Oishi et al. |
| 2003/0068053 A1 | 4/2003 | Chu |
| 2003/0214485 A1 | 11/2003 | Roberts |
| 2005/0031140 A1 | 2/2005 | Browning |
| 2005/0134562 A1 | 6/2005 | Grant et al. |
| 2005/0195919 A1 | 9/2005 | Cova |
| 2006/0028095 A1 | 2/2006 | Maruyama et al. |
| 2006/0197753 A1 | 9/2006 | Hotelling |
| 2007/0013337 A1 | 1/2007 | Liu et al. |
| 2007/0024254 A1 | 2/2007 | Radecker et al. |
| 2007/0241816 A1 | 10/2007 | Okazaki et al. |
| 2008/0077367 A1 | 3/2008 | Odajima |
| 2008/0226109 A1 | 9/2008 | Yamakata et al. |
| 2008/0240458 A1 | 10/2008 | Goldstein et al. |
| 2008/0293453 A1 | 11/2008 | Atlas et al. |
| 2008/0316181 A1 | 12/2008 | Nurmi |
| 2009/0020343 A1 | 1/2009 | Rothkopf et al. |
| 2009/0079690 A1 | 3/2009 | Watson et al. |
| 2009/0088220 A1 | 4/2009 | Persson |
| 2009/0096632 A1 | 4/2009 | Ullrich et al. |
| 2009/0102805 A1 | 4/2009 | Meijer et al. |
| 2009/0128306 A1 | 5/2009 | Luden et al. |
| 2009/0153499 A1 | 6/2009 | Kim et al. |
| 2009/0189867 A1 | 7/2009 | Krah et al. |
| 2009/0278819 A1 | 11/2009 | Goldenberg et al. |
| 2009/0313542 A1 | 12/2009 | Cruz-Hernandez et al. |
| 2010/0013761 A1 | 1/2010 | Birnbaum et al. |
| 2010/0080331 A1 | 4/2010 | Garudadri et al. |
| 2010/0085317 A1 | 4/2010 | Park et al. |
| 2010/0141408 A1 | 6/2010 | Doy et al. |
| 2010/0141606 A1 | 6/2010 | Bae et al. |
| 2010/0260371 A1 | 10/2010 | Afshar |
| 2010/0261526 A1 | 10/2010 | Anderson et al. |
| 2011/0056763 A1 | 3/2011 | Tanase et al. |
| 2011/0075835 A1 | 3/2011 | Hill |
| 2011/0077055 A1 | 3/2011 | Pakula et al. |
| 2011/0141052 A1 | 6/2011 | Bernstein et al. |
| 2011/0161537 A1 | 6/2011 | Chang |
| 2011/0163985 A1 | 7/2011 | Bae et al. |
| 2011/0167391 A1 | 7/2011 | Momeyer et al. |

(56) References Cited

U.S. PATENT DOCUMENTS

| | | |
|---|---|---|
| 2012/0011436 A1 | 1/2012 | Jinkinson et al. |
| 2012/0105358 A1 | 5/2012 | Momeyer et al. |
| 2012/0105367 A1 | 5/2012 | Son et al. |
| 2012/0112894 A1 | 5/2012 | Yang et al. |
| 2012/0206246 A1 | 8/2012 | Cruz-Hernandez et al. |
| 2012/0206247 A1 | 8/2012 | Bhatia et al. |
| 2012/0229264 A1 | 9/2012 | Company Bosch et al. |
| 2012/0249462 A1 | 10/2012 | Flanagan et al. |
| 2012/0253698 A1 | 10/2012 | Cokonaj |
| 2012/0306631 A1 | 12/2012 | Hughes |
| 2013/0016855 A1 | 1/2013 | Lee et al. |
| 2013/0027359 A1 | 1/2013 | Schevin et al. |
| 2013/0038792 A1 | 2/2013 | Quigley et al. |
| 2013/0096849 A1 | 4/2013 | Campbell et al. |
| 2013/0141382 A1 | 6/2013 | Simmons et al. |
| 2013/0275058 A1 | 10/2013 | Awad |
| 2013/0289994 A1 | 10/2013 | Newman et al. |
| 2013/0307786 A1 | 11/2013 | Heubel |
| 2014/0035736 A1 | 2/2014 | Weddle et al. |
| 2014/0056461 A1 | 2/2014 | Afshar |
| 2014/0064516 A1 | 3/2014 | Cruz-Hernandez et al. |
| 2014/0079248 A1 | 3/2014 | Short et al. |
| 2014/0085064 A1 | 3/2014 | Crawley et al. |
| 2014/0118125 A1 | 5/2014 | Bhatia |
| 2014/0118126 A1 | 5/2014 | Garg et al. |
| 2014/0119244 A1 | 5/2014 | Steer et al. |
| 2014/0125467 A1 | 5/2014 | Da Costa et al. |
| 2014/0139327 A1 | 5/2014 | Bau et al. |
| 2014/0176415 A1 | 6/2014 | Buuck et al. |
| 2014/0205260 A1 | 7/2014 | Lacroix et al. |
| 2014/0222377 A1 | 8/2014 | Bitan et al. |
| 2014/0226068 A1 | 8/2014 | Lacroix et al. |
| 2014/0253303 A1 | 9/2014 | Levesque |
| 2014/0292501 A1 | 10/2014 | Lim et al. |
| 2014/0300454 A1 | 10/2014 | Lacroix et al. |
| 2014/0340209 A1 | 11/2014 | Lacroix et al. |
| 2014/0347176 A1 | 11/2014 | Modarres et al. |
| 2015/0049882 A1 | 2/2015 | Chiu et al. |
| 2015/0061846 A1 | 3/2015 | Yliaho |
| 2015/0070149 A1 | 3/2015 | Cruz-Hernandez et al. |
| 2015/0070151 A1 | 3/2015 | Cruz-Hernandez et al. |
| 2015/0070154 A1 | 3/2015 | Levesque et al. |
| 2015/0070260 A1 | 3/2015 | Saboune et al. |
| 2015/0077324 A1 | 3/2015 | Birnbaum et al. |
| 2015/0084752 A1 | 3/2015 | Heubel et al. |
| 2015/0116205 A1 | 4/2015 | Westerman et al. |
| 2015/0130767 A1 | 5/2015 | Myers et al. |
| 2015/0208189 A1 | 7/2015 | Tsai |
| 2015/0216762 A1 | 8/2015 | Oohashi et al. |
| 2015/0234464 A1 | 8/2015 | Yliaho |
| 2015/0264455 A1 | 9/2015 | Granoto et al. |
| 2015/0268768 A1 | 9/2015 | Woodhull et al. |
| 2015/0324116 A1 | 11/2015 | Marsden et al. |
| 2015/0325116 A1 | 11/2015 | Umminger, III |
| 2015/0339898 A1 | 11/2015 | Saboune et al. |
| 2015/0341714 A1 | 11/2015 | Ahn et al. |
| 2015/0356981 A1 | 12/2015 | Johnson et al. |
| 2016/0004311 A1 | 1/2016 | Yliaho |
| 2016/0007095 A1 | 1/2016 | Lacroix |
| 2016/0063826 A1 | 3/2016 | Morrell et al. |
| 2016/0070392 A1 | 3/2016 | Wang et al. |
| 2016/0074278 A1 | 3/2016 | Muench et al. |
| 2016/0097662 A1 | 4/2016 | Chang et al. |
| 2016/0132118 A1 | 5/2016 | Park et al. |
| 2016/0162031 A1 | 6/2016 | Westerman et al. |
| 2016/0179203 A1 | 6/2016 | Modarres et al. |
| 2016/0187987 A1 | 6/2016 | Ullrich et al. |
| 2016/0239089 A1 | 8/2016 | Taninaka et al. |
| 2016/0246378 A1 | 8/2016 | Sampanes et al. |
| 2016/0277821 A1 | 9/2016 | Kunimoto |
| 2016/0291731 A1 | 10/2016 | Liu et al. |
| 2016/0328065 A1 | 11/2016 | Johnson et al. |
| 2016/0358605 A1 | 12/2016 | Ganong, III et al. |
| 2017/0031495 A1 | 2/2017 | Smith |
| 2017/0052593 A1 | 2/2017 | Jiang et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0153760 A1 | 6/2017 | Chawda et al. |
| 2017/0168574 A1 | 6/2017 | Zhang |
| 2017/0168773 A1 | 6/2017 | Keller et al. |
| 2017/0169674 A1 | 6/2017 | Macours |
| 2017/0180863 A1 | 6/2017 | Biggs et al. |
| 2017/0220197 A1 | 8/2017 | Matsumoto et al. |
| 2017/0256145 A1 | 9/2017 | Macours et al. |
| 2017/0277350 A1 | 9/2017 | Wang et al. |
| 2017/0357440 A1 | 12/2017 | Tse |
| 2018/0021811 A1 | 1/2018 | Kutez et al. |
| 2018/0033946 A1 | 2/2018 | Kemppinen et al. |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0095596 A1 | 4/2018 | Turgeman |
| 2018/0151036 A1 | 5/2018 | Cha et al. |
| 2018/0158289 A1 | 6/2018 | Vasilev et al. |
| 2018/0159452 A1 | 6/2018 | Eke et al. |
| 2018/0159457 A1 | 6/2018 | Eke |
| 2018/0159545 A1 | 6/2018 | Eke et al. |
| 2018/0160227 A1 | 6/2018 | Lawrence et al. |
| 2018/0165925 A1 | 6/2018 | Israr et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0194369 A1 | 7/2018 | Lisseman et al. |
| 2018/0196567 A1 | 7/2018 | Klein et al. |
| 2018/0224963 A1 | 8/2018 | Lee et al. |
| 2018/0227063 A1 | 8/2018 | Heubel et al. |
| 2018/0237033 A1 | 8/2018 | Hakeem et al. |
| 2018/0206282 A1 | 9/2018 | Singh |
| 2018/0253123 A1 | 9/2018 | Levesque et al. |
| 2018/0255411 A1 | 9/2018 | Lin et al. |
| 2018/0267897 A1 | 9/2018 | Jeong |
| 2018/0294757 A1 | 10/2018 | Feng et al. |
| 2018/0301060 A1 | 10/2018 | Israr et al. |
| 2018/0304310 A1 | 10/2018 | Long et al. |
| 2018/0321056 A1 | 11/2018 | Yoo et al. |
| 2018/0321748 A1 | 11/2018 | Rao et al. |
| 2018/0323725 A1 | 11/2018 | Cox et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0020760 A1 | 1/2019 | DeBates et al. |
| 2019/0035235 A1 | 1/2019 | Da Costa et al. |
| 2019/0227628 A1 | 1/2019 | Rand et al. |
| 2019/0044651 A1 | 2/2019 | Nakada |
| 2019/0051229 A1 | 2/2019 | Ozguner et al. |
| 2019/0064925 A1 | 2/2019 | Kim et al. |
| 2019/0069088 A1 | 2/2019 | Seiler |
| 2019/0073078 A1 | 3/2019 | Sheng et al. |
| 2019/0102031 A1 | 4/2019 | Shutzberg et al. |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0196596 A1 | 6/2019 | Yokoyama et al. |
| 2019/0206396 A1 | 7/2019 | Chen |
| 2019/0215349 A1 | 7/2019 | Adams et al. |
| 2019/0220095 A1 | 7/2019 | Ogita et al. |
| 2019/0228619 A1 | 7/2019 | Yokoyama et al. |
| 2019/0114496 A1 | 8/2019 | Lesso |
| 2019/0235629 A1 | 8/2019 | Hu et al. |
| 2019/0253031 A1 | 8/2019 | Vellanki et al. |
| 2019/0294247 A1 | 9/2019 | Hu et al. |
| 2019/0295755 A1 | 9/2019 | Konradi et al. |
| 2019/0296674 A1 | 9/2019 | Janko et al. |
| 2019/0297418 A1 | 9/2019 | Stahl |
| 2019/0305851 A1 | 10/2019 | Vegas-Olmos et al. |
| 2019/0311590 A1 | 10/2019 | Doy et al. |
| 2019/0341903 A1 | 11/2019 | Kim |
| 2019/0384393 A1 | 12/2019 | Cruz-Hernandez et al. |
| 2019/0384898 A1 | 12/2019 | Chen et al. |

(56) References Cited

U.S. PATENT DOCUMENTS

| | | | |
|---|---|---|---|
| 2020/0117506 A1 | 4/2020 | Chan | |
| 2020/0139403 A1 | 5/2020 | Palit | |
| 2020/0150767 A1 | 5/2020 | Karimi Eskandary et al. | |
| 2020/0218352 A1 | 7/2020 | Macours et al. | |
| 2020/0231085 A1 | 7/2020 | Kunii et al. | |
| 2020/0306796 A1 | 10/2020 | Lindemann et al. | |
| 2020/0313529 A1 | 10/2020 | Lindemann | |
| 2020/0313654 A1 | 10/2020 | Marchais et al. | |
| 2020/0314969 A1 | 10/2020 | Marchais et al. | |
| 2020/0348249 A1 | 11/2020 | Marchais et al. | |
| 2020/0403546 A1 | 12/2020 | Janko et al. | |
| 2021/0108975 A1 | 4/2021 | Peso Parada et al. | |
| 2021/0125469 A1 | 4/2021 | Alderson | |
| 2021/0153562 A1 | 5/2021 | Fishwick et al. | |
| 2021/0157436 A1 | 5/2021 | Peso Parada et al. | |
| 2021/0174777 A1 | 6/2021 | Marchais et al. | |
| 2021/0175869 A1 | 6/2021 | Taipale | |
| 2021/0200316 A1 | 7/2021 | Das et al. | |
| 2021/0325967 A1 | 10/2021 | Khenkin et al. | |
| 2021/0328535 A1 | 10/2021 | Khenkin et al. | |
| 2021/0365118 A1 | 11/2021 | Rajapurkar et al. | |
| 2022/0026989 A1 | 1/2022 | Rao et al. | |
| 2022/0328752 A1* | 10/2022 | Lesso | H01L 41/107 |
| 2022/0404398 A1 | 12/2022 | Reynaga et al. | |

FOREIGN PATENT DOCUMENTS

| | | | |
|---|---|---|---|
| CN | 104811838 A | 7/2015 | |
| CN | 204903757 U | 12/2015 | |
| CN | 105264551 A | 1/2016 | |
| CN | 106438890 A | 2/2017 | |
| CN | 103403796 A | 7/2017 | |
| CN | 106950832 A | 7/2017 | |
| CN | 107665051 A | 2/2018 | |
| CN | 107835968 A | 3/2018 | |
| CN | 107835968 A * | 3/2018 | ............. G06F 3/016 |
| CN | 210628147 U | 5/2020 | |
| CN | 114237414 A | 3/2022 | |
| EP | 0784844 B1 | 6/2005 | |
| EP | 2306269 A | 4/2011 | |
| EP | 2363785 A1 | 9/2011 | |
| EP | 2487780 A1 | 8/2012 | |
| EP | 2600225 A1 | 6/2013 | |
| EP | 2846218 A1 | 3/2015 | |
| EP | 2846229 A2 | 3/2015 | |
| EP | 2846329 A1 | 3/2015 | |
| EP | 2988528 A1 | 2/2016 | |
| EP | 3125508 A1 | 2/2017 | |
| EP | 3379382 A1 | 9/2018 | |
| GB | 201620746 A | 1/2017 | |
| IN | 201747044027 | 8/2018 | |
| JP | H02130433 B2 | 5/1990 | |
| JP | 08149006 A | 6/1996 | |
| JP | H10184782 A | 7/1998 | |
| JP | 6026751 B2 | 11/2016 | |
| JP | 6250985 | 12/2017 | |
| JP | 6321351 | 5/2018 | |
| KR | 20120126446 A | 11/2012 | |
| WO | 2013104919 A1 | 7/2013 | |
| WO | 2013186845 A1 | 12/2013 | |
| WO | 2014018086 A1 | 1/2014 | |
| WO | 2014094283 A1 | 6/2014 | |
| WO | 2016105496 A1 | 6/2016 | |
| WO | 2016164193 A1 | 10/2016 | |
| WO | 2017034973 A1 | 3/2017 | |
| WO | 2017113651 A1 | 7/2017 | |
| WO | 2018053159 A1 | 3/2018 | |
| WO | 2018067613 A1 | 4/2018 | |
| WO | 2018125347 A1 | 7/2018 | |
| WO | 2020004840 A1 | 1/2020 | |
| WO | 2020055405 A1 | 3/2020 | |

OTHER PUBLICATIONS

International Search Report and Written Opinion of the International Searching Authority, International Application No. PCT/GB2020/052537, dated Mar. 9, 2021.
Office Action of the Intellectual Property Office, ROC (Taiwan) Patent Application No. 107115475, dated Apr. 30, 2021.
First Office Action, China National Intellectual Property Administration, Patent Application No. 2019800208570, dated Jun. 3, 2021.
International Search Report and Written Opinion of the International Searching Authority, International Application No. PCT/US2021/021908, dated Jun. 9, 2021.
Notice of Preliminary Rejection, Korean Intellectual Property Office, Application No. 10-2019-7036236, dated Jun. 29, 2021.
Combined Search and Examination Report, United Kingdom Intellectual Property Office, Application No. GB2018051.9, dated Jun. 30, 2021.
Communication pursuant to Rule 164(2)(b) and Article 94(3) EPC, European Patent Office, Application No. 18727512.8, dated Jul. 8, 2021.
Gottfried Behler: "Measuring the Loudspeaker's Impedance during Operation for the Derivation of the Voice Coil Temperature", AES Convention Preprint, Feb. 25, 1995 (Feb. 25, 1995), Paris.
First Office Action, China National Intellectual Property Administration, Patent Application No. 2019800211287, dated Jul. 5, 2021.
Steinbach et al., Haptic Data Compression and Communication, IEEE Signal Processing Magazine, Jan. 2011.
Pezent et al., Syntacts Open-Source Software and Hardware for Audio-Controlled Haptics, IEEE Transactions on Haptics, vol. 14, No. 1, Jan.-Mar. 2021.
Examination Report under Section 18(3), United Kingdom Intellectual Property Office, Application No. GB2018051.9, dated Nov. 5, 2021.
Jaijongrak et al., A Haptic and Auditory Assistive User Interface: Helping the Blinds on their Computer Operations, 2011 IEEE International Conference on Rehabilitation Robotics, Rehab Week Zurich, ETH Zurich Science City, Switzerland, Jun. 29-Jul. 1, 2011.
Lim et al., An Audio-Haptic Feedbacks for Enhancing User Experience in Mobile Devices, 2013 IEEE International Conference on Consumer Electronics (ICCE).
Weddle et al., How Does Audio-Haptic Enhancement Influence Emotional Response to Mobile Media, 2013 Fifth International Workshop on Quality of Multimedia Experience (QoMEX), QMEX 2013.
Danieau et al., Enhancing Audiovisual Experience with Haptic Feedback: A Survey on HAV, IEEE Transactions on Haptics, vol. 6, No. 2, Apr.-Jun. 2013.
Danieau et al., Toward Haptic Cinematography: Enhancing Movie Experiences with Camera-Based Haptic Effects, IEEE Computer Society, IEEE MultiMedia, Apr.-Jun. 2014.
Final Notice of Preliminary Rejection, Korean Patent Office, Application No. 10-2019-7036236, dated Nov. 29, 2021.
Examination Report under Section 18(3), United Kingdom Intellectual Property Office, Application No. GB2018050.1, dated Dec. 22, 2021.
Second Office Action, National Intellectual Property Administration, PRC, Application No. 2019800208570, dated Jan. 19, 2022.
Examination Report under Section 18(3), UKIPO, Application No. GB2106247.6, dated Mar. 31, 2022.
International Search Report and Written Opinion of the International Searching Authority, International Application No. PCT/GB2019/050964, dated Sep. 3, 2019.
International Search Report and Written Opinion of the International Searching Authority, International Application No. PCT/GB2019/050770, dated Jul. 5, 2019.
Communication Relating to the Results of the Partial International Search, and Provisional Opinion Accompanying the Partial Search Result, of the International Searching Authority, International Application No. PCT/US2018/031329, dated Jul. 20, 2018.
Combined Search and Examination Report, UKIPO, Application No. GB1720424.9, dated Jun. 5, 2018.
International Search Report and Written Opinion of the International Searching Authority, International Application No. PCT/GB2019/052991, dated Mar. 17, 2020.

(56) References Cited

OTHER PUBLICATIONS

Communication Relating to the Results of the Partial International Search, and Provisional Opinion Accompanying the Partial Search Result, of the International Searching Authority, International Application No. PCT/GB2020/050822, dated Jul. 9, 2020.
International Search Report and Written Opinion of the International Searching Authority, International Application No. PCT/US2020/024864, dated Jul. 6, 2020.
International Search Report and Written Opinion of the International Searching Authority, International Application No. PCT/GB2020/051035, dated Jul. 10, 2020.
International Search Report and Written Opinion of the International Searching Authority, International Application No. PCT/GB2020/050823, dated Jun. 30, 2020.
International Search Report and Written Opinion of the International Searching Authority, International Application No. PCT/GB2020/051037, dated Jul. 9, 2020.
International Search Report and Written Opinion of the International Searching Authority, International Application No. PCT/GB2020/050822, dated Aug. 31, 2020.
International Search Report and Written Opinion of the International Searching Authority, International Application No. PCT/GB2020/051438, dated Sep. 28, 2020.
First Examination Opinion Notice, State Intellectual Property Office of the People's Republic of China, Application No. 201880037435.X, dated Dec. 31, 2020.
International Search Report and Written Opinion of the International Searching Authority, International Application No. PCT/US2020/056610, dated Jan. 21, 2021.
Combined Search and Examination Report under Sections 17 and 18(3), UKIPO, Application No. GB2210174.5, dated Aug. 1, 2022.
Examination Report under Section 18(3), UKIPO, Application No. GB2112207.2, dated Aug. 18, 2022.
International Search Report and Written Opinion of the International Searching Authority, International Application No. PCT/US2022/030541, dated Sep. 1, 2022.
Vanderborght, B. et al., Variable impedance actuators: A review; Robotics and Autonomous Systems 61, Aug. 6, 2013, pp. 1601-1614.
International Search Report and Written Opinion of the International Searching Authority, International Application No. PCT/US2022/033190, dated Sep. 8, 2022.
International Search Report and Written Opinion of the International Searching Authority, International Application No. PCT/US2022/033230, dated Sep. 15, 2022.
Examination Report under Section 18(3), UKIPO, Application No. GB2115048.7 dated Aug. 24, 2022.
Communication Pursuant to Article 94(3) EPC, European Patent Office, Application No. 18727512.8, dated Sep. 26, 2022.
Examination Report under Section 18(3), UKIPO, Application No. GB2112207.2, dated Nov. 7, 2022.
Examination Report, Intellectual Property India, Application No. 202117019138, dated Jan. 4, 2023.
Examination Report under Section 18(3), UKIPO, Application No. GB2113228.7, dated Feb. 10, 2023.
Examination Report under Section 18(3), UKIPO, Application No. GB2113154.5, dated Feb. 17, 2023.
First Office Action, China National Intellectual Property Administration, Application No. 2019107179621, dated Jan. 19, 2023.

* cited by examiner

CONTROL METHODS FOR A FORCE SENSOR SYSTEM

RELATED PATENTS

The present disclosure is a continuation of U.S. patent application Ser. No. 16/850,117, filed Apr. 16, 2020, which claims benefit of U.S. Provisional Patent Application Ser. No. 62/915,245, filed Oct. 15, 2019, each of which is incorporated by reference herein in its entirety; and relates to U.S. Provisional Patent Application Ser. No. 62/842,821, filed May 3, 2019 and U.S. patent application Ser. No. 16/422,543, filed May 24, 2019, all of which are incorporated by reference herein in their entireties.

FIELD OF DISCLOSURE

The present disclosure relates to control methods for a force sensor system, and in particular to systems and methods for compensating for the effects of temperature on force sensing systems.

BACKGROUND

Force sensors are known as possible input devices for electronic systems, and can be used as an alternative to traditional mechanical switches.

Many traditional mobile devices (e.g., mobile phones, personal digital assistants, video game controllers, etc.) include mechanical buttons to allow for interaction between a user of a mobile device and the mobile device itself. However, such mechanical buttons are susceptible to aging, wear, and tear that may reduce the useful life of a mobile device and/or may require significant repair if malfunction occurs. Also, the presence of mechanical buttons may render it difficult to manufacture mobile devices to be waterproof.

Accordingly, mobile device manufacturers are increasingly looking to equip mobile devices with virtual buttons that act as a human-machine interface allowing for interaction between a user of a mobile device and the mobile device itself. Similarly, mobile device manufacturers are increasingly looking to equip mobile devices with other virtual interface areas (e.g., a virtual slider, interface areas of a body of the mobile device other than a touch screen, etc.). Ideally, for best user experience, such virtual interface areas should look and feel to a user as if a mechanical button or other mechanical interface were present instead of a virtual button or virtual interface area.

Presently, linear resonant actuators (LRAs) and other vibrational actuators (e.g., rotational actuators, vibrating motors, etc.) are increasingly being used in mobile devices to generate vibrational feedback in response to user interaction with human-machine interfaces of such devices. Typically, a sensor (traditionally a force or pressure sensor) detects user interaction with the device (e.g., a finger press on a virtual button of the device) and in response thereto, the linear resonant actuator may vibrate to provide feedback to the user. For example, a linear resonant actuator may vibrate in response to user interaction with the human-machine interface to mimic to the user the feel of a mechanical button click.

Force sensors thus detect forces on the device to determine user interaction, e.g. touches, presses, or squeezes of the device. There is a need to provide systems to process the output of such sensors which balances low power consumption with responsive performance.

There is a need in the industry for sensors to detect user interaction with a human-machine interface, wherein such sensors and related sensor systems provide acceptable levels of sensor sensitivity, power consumption, and size. There is also a need in the industry to provide force sensor systems with improved operation over a range of operating environments.

SUMMARY

According to a first aspect of the present disclosure, there is provided a control method for a force sensor system used to define at least one virtual button, the control method comprising the steps of: receiving a force sensor input; determining a gradient of the force sensor input; and comparing the determined gradient to a gradient threshold to determine a user press event of a virtual button.

According to a second aspect of the present disclosure, there is provided a control method for a force sensor system used to define at least one virtual button, the control method comprising the steps of: receiving a force sensor input; determining a gradient of the force sensor input; and comparing the determined gradient to a first re-calibration threshold to determine a re-calibration requirement of the force sensor system.

According to a third aspect of the present disclosure, there is provided a control method for a force sensor system used to define at least one virtual button, the control method comprising the steps of: receiving a force sensor input; determining first and second derivatives of the force sensor input to provide velocity and acceleration values; mapping the velocity and acceleration values to a 2D representation; and performing quadrant tracking or state space tracking of the 2D representation of the velocity and acceleration values to determine if a user press event has occurred.

According to a fourth aspect of the present disclosure, there is provided a method of controlling a force sensor system to define at least one button implemented by at least one force sensor, the method comprising: receiving a force sensor input; determining a gradient of the force sensor input; and controlling the force sensor system based on the determined gradient.

Any of the aforementioned aspects may be employed in combination.

According to a fifth aspect of the present disclosure, there is provided a force sensor system, comprising: at least one force sensor; and a controller connected to the at least one force sensor and configured to carry out the method of any of the aforementioned aspects.

According to a sixth aspect of the present disclosure, there is provided a host device comprising the force sensor system according to the aforementioned fifth aspect.

Computer program aspects corresponding to the method aspects are envisaged, as are (non-transitory) storage medium aspects storing computer programs of the computer program aspects.

BRIEF DESCRIPTION OF THE DRAWINGS

Reference will now be made, by way of example only, to the accompanying drawings, of which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
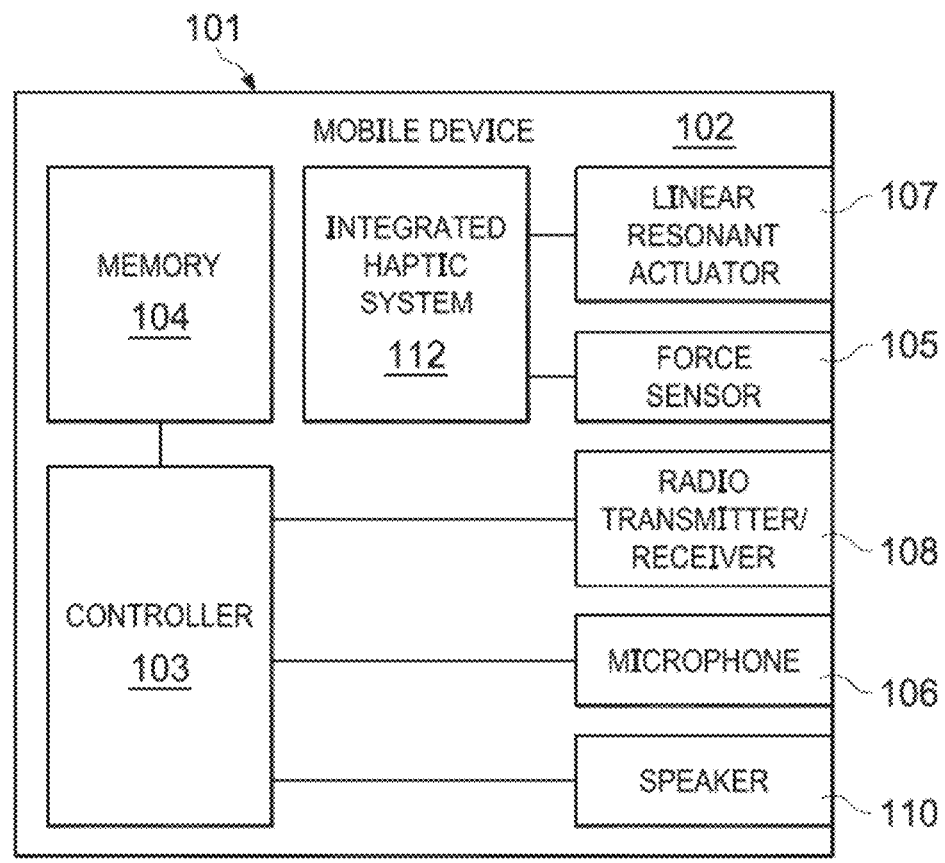
FIG. 1 illustrates a block diagram of selected components of an example mobile device.

FIG. 1 illustrates a block diagram of selected components of an example mobile device 102, in accordance with embodiments of the present disclosure.

As shown in FIG. 1, mobile device 102 may comprise an enclosure 101, a controller 103, a memory 104, a force sensor or force sensor system 105, a microphone 106, a linear resonant actuator (LRA) 107, a radio transmitter/receiver 108, a speaker 110, and an integrated haptic system 112. It will be understood that any suitable vibrational actuators arranged to provide a haptic vibration effect (e.g., rotational actuators such as ERMs, vibrating motors, etc.) may be used as an alternative to or in addition to the LRA 107.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, a headphone or earphone or any other device that may be readily transported on a person of a user of mobile device 102. While FIG. 1 illustrates a mobile device, it will be understood that the illustrated systems may be utilized in other device types, e.g. user-interactable display technology, automotive computing systems, etc.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, 5G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

The force sensor 105 may be housed within, be located on or form part of the enclosure 101, and may be communicatively coupled to the controller 103. Each force sensor of a device 102 may include any suitable system, device, or apparatus for sensing a force, a pressure, or a touch (e.g., an interaction with a human finger) and for generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general-purpose input/output (GPIO) signal associated with an input signal to which haptic feedback is given.

Example force sensors 105 may include or comprise: capacitive displacement sensors, inductive force sensors, strain gauges, piezoelectric force sensors, force sensing resistors, piezoresistive force sensors, thin film force sensors, and quantum tunneling composite-based force sensors.

In some arrangements, other types of sensor may be employed. For purposes of clarity and exposition in this disclosure, the term "force" as used herein may refer not only to force, but to physical quantities indicative of force or analogous to force, such as, but not limited to, pressure and touch.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range.

While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. A linear resonant actuator 107, based on a signal received from integrated haptic system 112, may render haptic feedback to a user of mobile device 102 for at least one of mechanical button replacement and capacitive sensor feedback.

Integrated haptic system 112 may be housed within enclosure 101, may be communicatively coupled to force sensor 105 and linear resonant actuator 107, and may include any system, device, or apparatus configured to receive a signal from force sensor 105 indicative of a force applied to mobile device 102 (e.g., a force applied by a human finger to a virtual button of mobile device 102) and generate an electronic signal for driving linear resonant actuator 107 in response to the force applied to mobile device 102.

Although specific example components are depicted above as being integral to mobile device 102 (e.g., controller 103, memory 104, force sensor 105, microphone 106, radio transmitter/receiver 108, speakers(s) 110), a mobile device 102 in accordance with this disclosure may comprise one or more components not specifically enumerated above. For example, although FIG. 1 depicts certain user interface components, mobile device 102 may include one or more other user interface components in addition to those depicted in the above figure, including but not limited to a keypad, a touch screen, and a display, thus allowing a user to interact with and/or otherwise manipulate mobile device 102 and its associated components.

In addition, it will be understood that the device may be provided with additional input sensor devices or transducers, for example accelerometers, gyroscopes, cameras, or other sensor devices.

Some force sensor systems are sensitive to variations in temperature (or other properties of the operating environment such as pressure). For example, for resistive force sensor systems where a bias voltage is applied to the sensors, changes in temperature can create changes in the bias of the force signal, resulting in changes to the baseline of operation of the sensor system.

Figure 2:
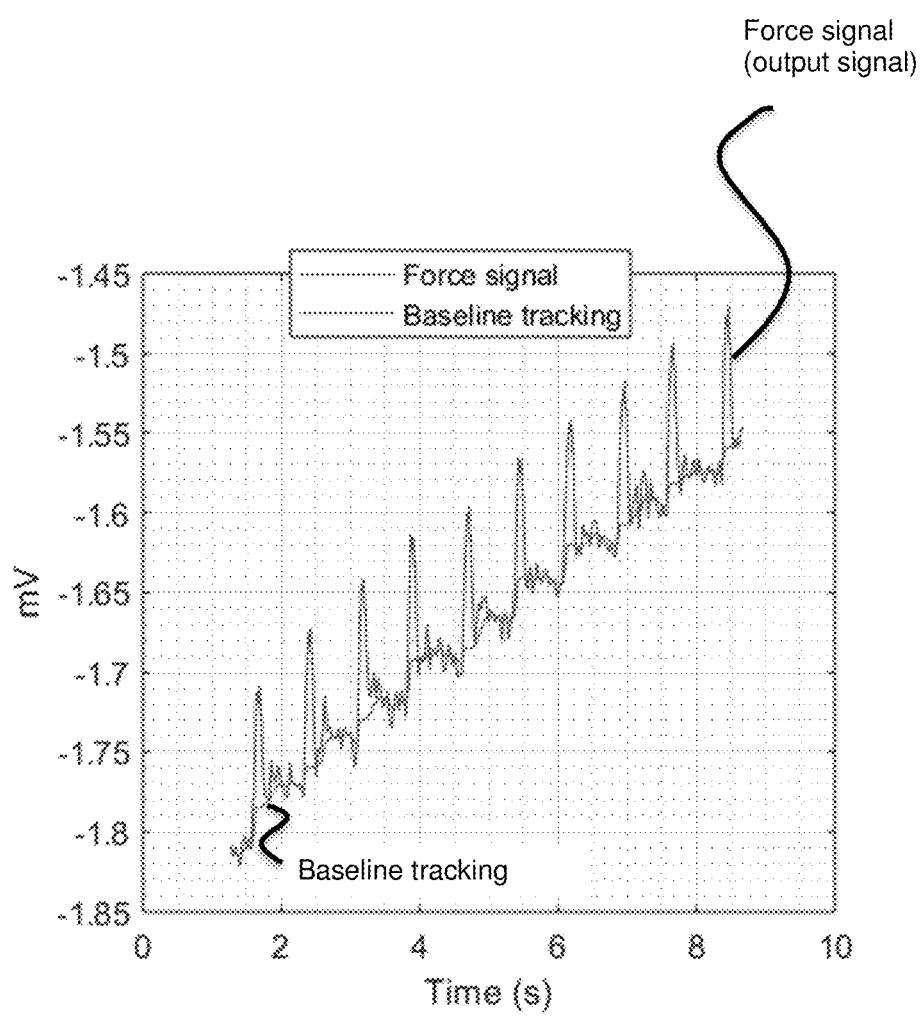
FIG. 2 is a graph showing an example output of a resistive force sensor system.

FIG. 2 is a graph showing an example output of a resistive force sensor system as the system temperature increases over time. The output signal is shown as an analogue voltage signal, in mV.

The upper line illustrates the output signal (Force signal), with the signal peaks indicating the occurrence of touch events detected by the sensor system. The lower line (Baseline tracking) illustrates the output of a baseline tracking system, to monitor for changes in the bias applied to the resistive force sensor system. As can be seen, the increasing temperature of the system results in a steadily increasing bias (baseline) of the system.

It is noted that depending on the force sensor system setup (i.e. an actual implementation), and for example on the type/structure of the mobile device 102 comprising the system, it may be that an increasing temperature of the system results in a steadily increasing bias (baseline) of the system (as above) or conversely a decreasing bias (baseline) of the system. The present disclosure will be understood accordingly. In either case, the bias (baseline) of the system may change with temperature (or another environmental factor).

Additionally or alternatively, the sensitivity of the sensors (such as force sensor 105) themselves can change with changes in temperature, with an increase (or decrease) in temperature resulting in a reduction in sensitivity.

An issue with force sensor systems can arise when a portion of a device such as device 102, e.g. a frame or casing of a mobile device such as enclosure 101, is at a relatively hot temperature (e.g. 60 degrees Celsius), and where a user touches the device with a finger at normal body temperature (e.g. 37 degrees Celsius). This can result in a temperature difference between locations on the device, which may translate into temperature variations in a force sensor system. For sensor systems using an arrangement of multiple force sensors (such as force sensor 105), e.g. resistive force sensors arranged in a Whetstone Bridge configuration or similar, the temperature variation can occur between different portions of the sensor, creating a temporary baseline drift.

Figure 3:
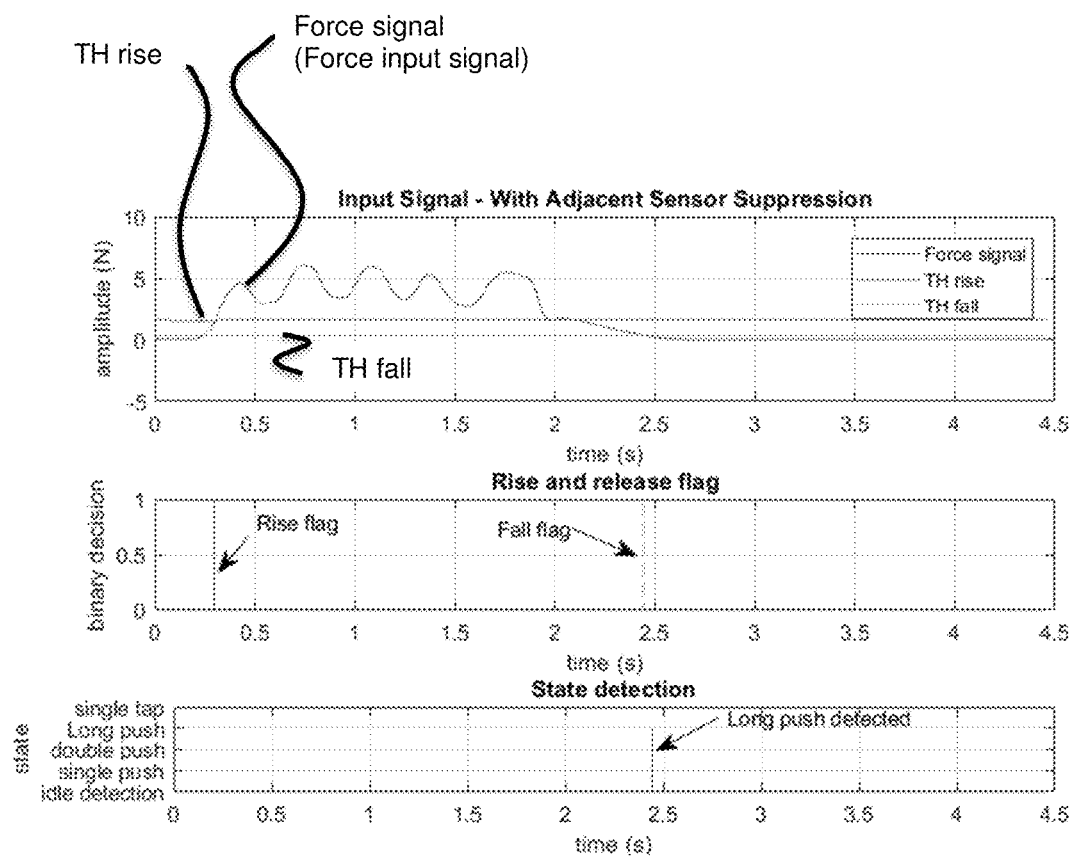
FIG. 3 presents graphs showing example outputs of a resistive force sensor system.

FIG. 3 presents graphs showing example outputs of a resistive force sensor system (force sensor solution) where a force input signal (corresponding to the output signal in FIG. 2) is generated by a force sensor such as force sensor 105 subjected to temperature variation due to a hot frame/cold finger use case as described above.

The uppermost graph shows the force input signal over time. The force input signal is shown as an analogue signal, expressed in N (Newtons). It will be appreciated that analogue voltage signals received from a force sensor such as force sensor 105 (such as the output signal in FIG. 2) may be converted into corresponding force input signals expressed in units of force (such as the force input signal in FIG. 3).

The input is compared against fixed thresholds (shown in the upper graph as TH rise and TH fall) to determine a rising edge (TH rise) and a falling edge (TH fall) of a user touch or press event.

The middle graph shows the result of a comparison over time of the force input signal against the thresholds TH rise and TH fall, the result being a binary output of logic 1 for a rise flag when the force input signal rises above (or crosses in an upward direction) the threshold TH rise and a binary output of logic 1 for a fall flag when the force input signal falls below (or crosses in a downward direction) the threshold TH fall. The rise flag and fall flag signals are otherwise at logic 0.

The lowermost graph shows the result of state detection logic performed over time based on the flag signals. The available states indicated by the state signal shown in this example are "single tap", "long push", "double push", "single push" and "idle detection", e.g. corresponding to common user inputs (or lack of inputs) in relation to a mobile device 102 such a smartphone. The state signal indicates the "idle detection" state in this example unless one of the other states is detected, in which case that state is indicated.

In this case, even though five individual presses are performed by a user (as indicated by the five peaks of the force input signal in the uppermost graph), due to the increase in the baseline due to the temperature variation only a long press is detected (as indicated in the lowermost graph) instead of five individual presses.

A gradient release threshold method intended to address the above issue will now be considered. In overview, it is proposed to analyze the gradient of a force input signal, i.e. its rate of change with respect to time or its first derivative with respect to time (first time derivative), and to use the gradient to detect the release of a button implemented by one or more force sensors, which may be considered a virtual button, and/or to trigger a recalibration of the force sensor system.

Here, the release of the button may be considered the process of the user retracting a finger (or stylus or other body part or similar) from the surface in respect of which the force sensor or sensors are measuring an applied force, so that the measured applied force reduces from a relatively high level (corresponding to a press or push of the button) to a relatively low level (corresponding to the button no longer being pressed or pushed, i.e. the end of the press or push). Recalibration may be understood as the process of setting a baseline value to, or based on, the current force input value.

Figure 4:
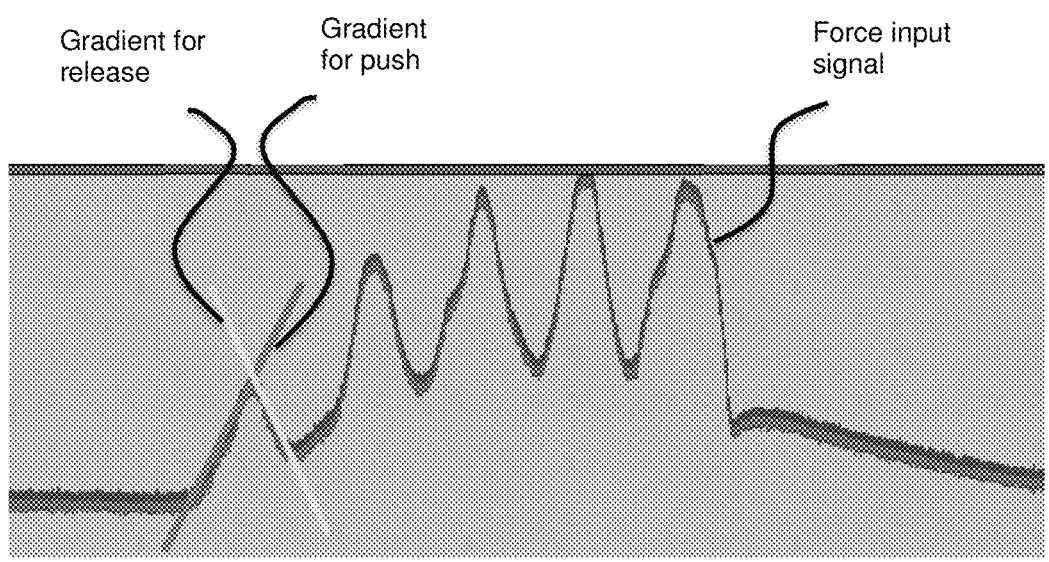
FIG. 4 is a graph illustrating an example input from a force sensor over time, during a series of user press events.

FIG. 4 is a graph illustrating an example input from a force sensor (i.e. a force input signal) over time, during a series of user press events. Thus, although not shown explicitly in FIG. 4, it can be assumed that the graph has axes corresponding to those in the uppermost graph in FIG. 3.

The gradient of the user press event when the button is pushed (indicated by the rising line superimposed on the first rising edge of the input signal) is approximately the same (in magnitude) as the gradient when the button is released (indicated by the falling line superimposed on the first falling edge of the input signal).

It can be seen that the gradient for the push event (i.e. when the applied force is increased from a non-pushed state) is positive and the gradient for the release event (i.e. when the applied force is decreased back to the non-pushed state) is negative. Accordingly, once the press (or push) is detected (e.g. based on comparison of the input with a rise threshold such as TH rise in FIG. 3 or based on a comparison of the gradient with a positive gradient threshold), the release can be detected by applying a (negative) gradient threshold to the negative gradient, optionally and a force level threshold to the applied force using an OR operation. If either of these conditions are met, a release flag can be triggered. That is, if either the applied force falls below the force level threshold or the falling gradient falls below (i.e. becomes more negative than) the gradient threshold, then the virtual button has been released. Once the virtual button has been released, a baseline tracking system may be then activated.

Figure 5:
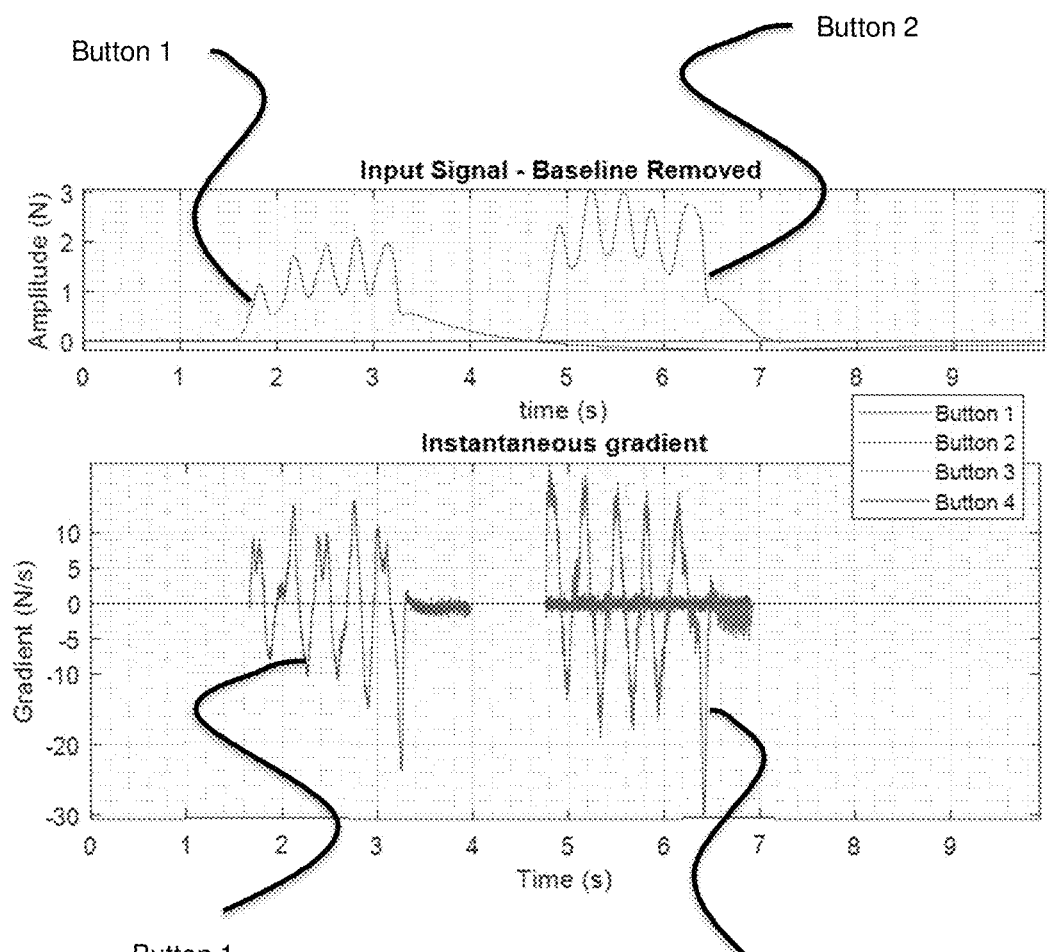
FIG. 5 presents graphs showing example outputs of a resistive force sensor system.

FIG. 5 presents graphs showing example outputs of a resistive force sensor system.

The upper graph shows the force sensor inputs (force input signals) over time in respect of four (virtual) buttons for a series of user press events which occur in respect of two of those buttons. The force input signals are shown as analogue signals, expressed in N in line with FIG. 3. The indication "baseline removed" indicates that there is no baseline trace present, in contrast for example to FIG. 2. However, it will be appreciated that the baseline is being shifted (and not corrected for) due to a change in temperature, e.g. associated with the user press events.

The lower graph shows the instantaneous gradient of the input signals shown in the upper graph. Thus, the gradient signals are shown as analogue signals, expressed in N/s. The gradient threshold (for detecting a release event) is selected such that when the instantaneous gradient falls below the gradient threshold, a release event of the virtual button is detected. In the illustrated example, a suitable release threshold of e.g. −5 N/s would detect the release of the virtual button for each of the user press events. It will be understood that the threshold may be dependent on the stiffness of the device chassis or frame. Accordingly, for different device chassis or frame configurations, the release threshold may be set to a different level.

Figure 6:
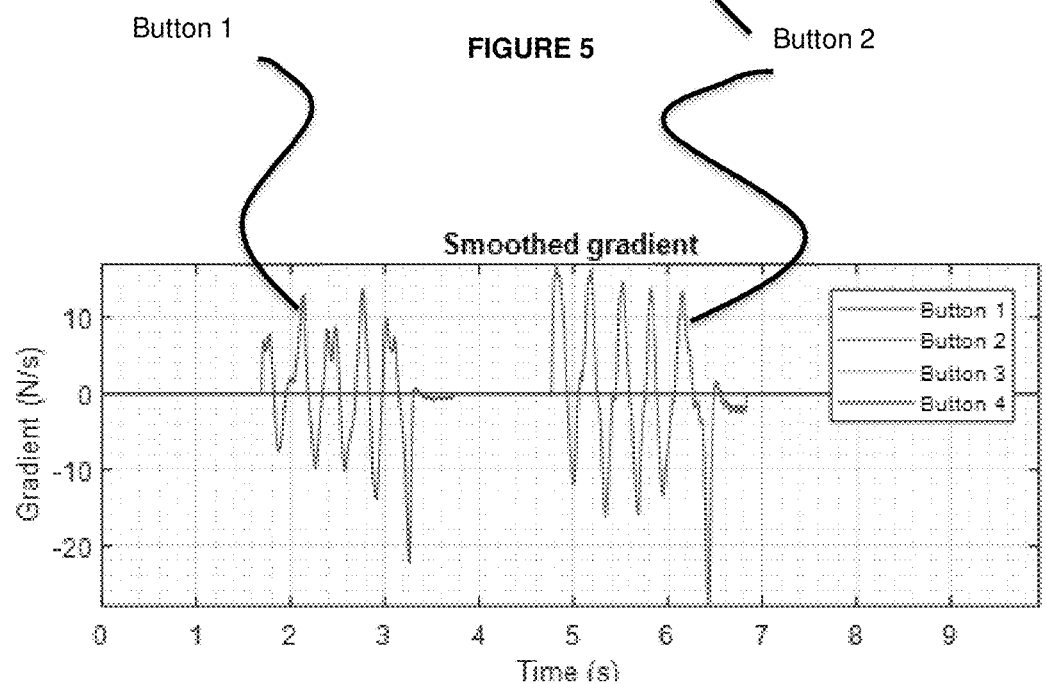
FIG. 6 presents a graph corresponding to the lower graph in FIG. 5.

FIG. 6 presents a graph corresponding to the lower graph in FIG. 5. In a preferred aspect, a smoothing filter is applied to the gradient signal, to provide a smoothed gradient with the removal of high frequency noise from the signal, as indicated. The smoothed gradient signal may then be used in the methods disclosed herein, in place of or in addition to the unsmoothed gradient signal. Such a smoothed gradient may be provided by applying a low-pass filtering of the gradient signal.

Additionally or alternatively, the analysis of the falling gradient may be used as part of a system to trigger a re-calibration of a force sensor system.

In a preferred aspect, the re-calibration may be triggered if the gradient is lower than the negative threshold. However, the point where the system is re-calibrated is not when the gradient is lower than the negative threshold, rather the re-calibration is performed when the gradient is larger than a second threshold, to ensure that the re-calibration will occur at the correct point.

For example, it may be desirable to re-calibrate once the gradient has become more negative than the negative threshold (part of a release event) and then risen up to become 0 (indicating the end of the release event). Baseline re-calibration may have the effect of re-calibrating the force input signal back to indicating a zero value (0 N) at that point, i.e. for that input from the force sensor(s), in this case when the gradient is also zero (0 N/s).

Figure 7A:
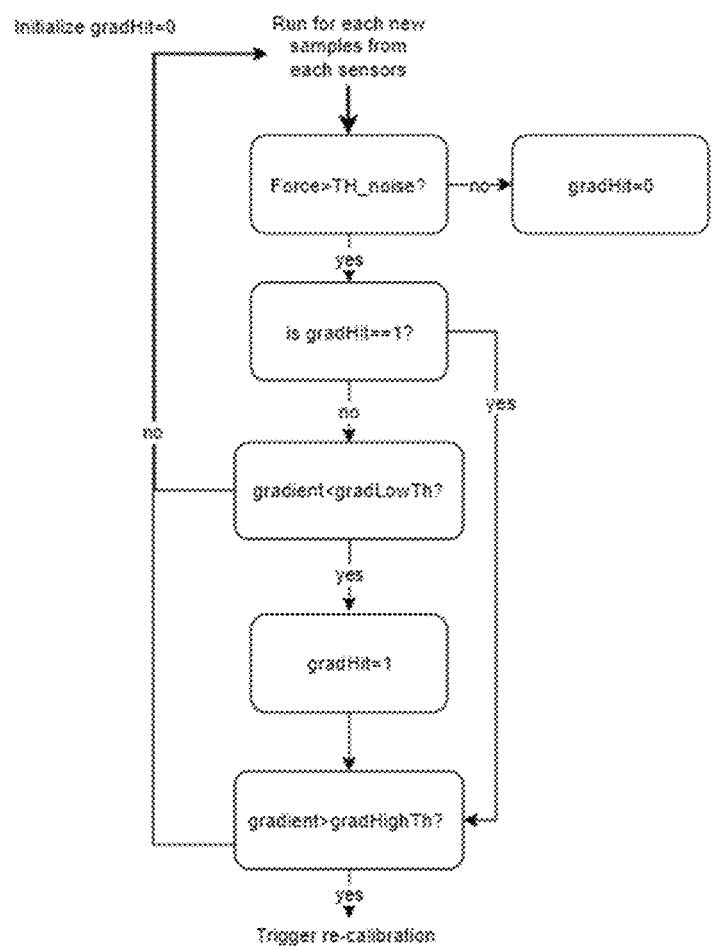
FIG. 7A is a schematic diagram of a control method which could be operated by the force sensor system to determine when to re-calibrate.

FIG. 7A is a schematic diagram of a control method which could be operated by the force sensor system (or the device 102 having that system) to determine when to re-calibrate.

Initially a flag gradHit is set to 0, and a series of samples are received from the force sensor system. The samples ("Force") are compared to a noise threshold TH_noise (Force>TH_noise?). The noise threshold TH_noise could be the same as, or replaced with, the threshold TH rise in FIG. 3. If the samples are below the noise threshold, then the flag gradHit is set to 0 and the process re-started. If the samples (i.e. sample values) are above the noise threshold, then the flag gradHit is checked to see if it has been set to 1.

If gradHit is at 0, then the gradient of the force signal ("gradient") is compared to the falling gradient threshold gradLowTH (gradient<gradLowTH?). If the gradient of the falling edge of the force signal is below the falling gradient threshold, then this indicates that a re-calibration is required, and the flag gradHit is set to 1. In one example, the falling gradient threshold is set at a level of −5 N/s. The falling gradient here could be set at a level lower than (i.e. more negative than, and thus having a larger absolute value than) that used to detect a release event, i.e. to detect a "very" negative gradient which may indicate the need for re-calibration.

The gradient of the falling edge of the force signal is compared to a second gradient threshold gradHighTh (gradient>gradHighTh?), to determine if the re-calibration can be performed. If the gradient is above (or at) the second threshold, e.g. 0 N/s, then the re-calibration of the force sensor system can be triggered. If the gradient is below the second threshold, then a further set of samples are received, and if the samples are above the noise threshold (TH_noise) and the gradHit flag is set, then if the gradient is above the second threshold the re-calibration can be triggered.

The comparison of the gradient with two separate thresholds allows for the detection of a required re-calibration, and ensures that the re-calibration is performed at the correct point of the force sensor system operation (e.g. when the gradient is zero after a touch event).

A further step could be interjected between the successful comparison of the gradient to the second gradient threshold (gradient>gradHighTh?=yes) and the triggering of the re-calibration. For example, a comparison could be made between the samples ("Force") and the fall threshold TH fall of FIG. 3 to see if the samples are greater than that threshold (Force>TH fall?). If the samples are greater than that threshold (Force>TH fall?=yes) then the re-calibration may be triggered. Otherwise (Force>TH fall?=no), the re-calibration may not be triggered as the re-calibration may not be necessary when the samples are at such a low level.

Figure 7B:
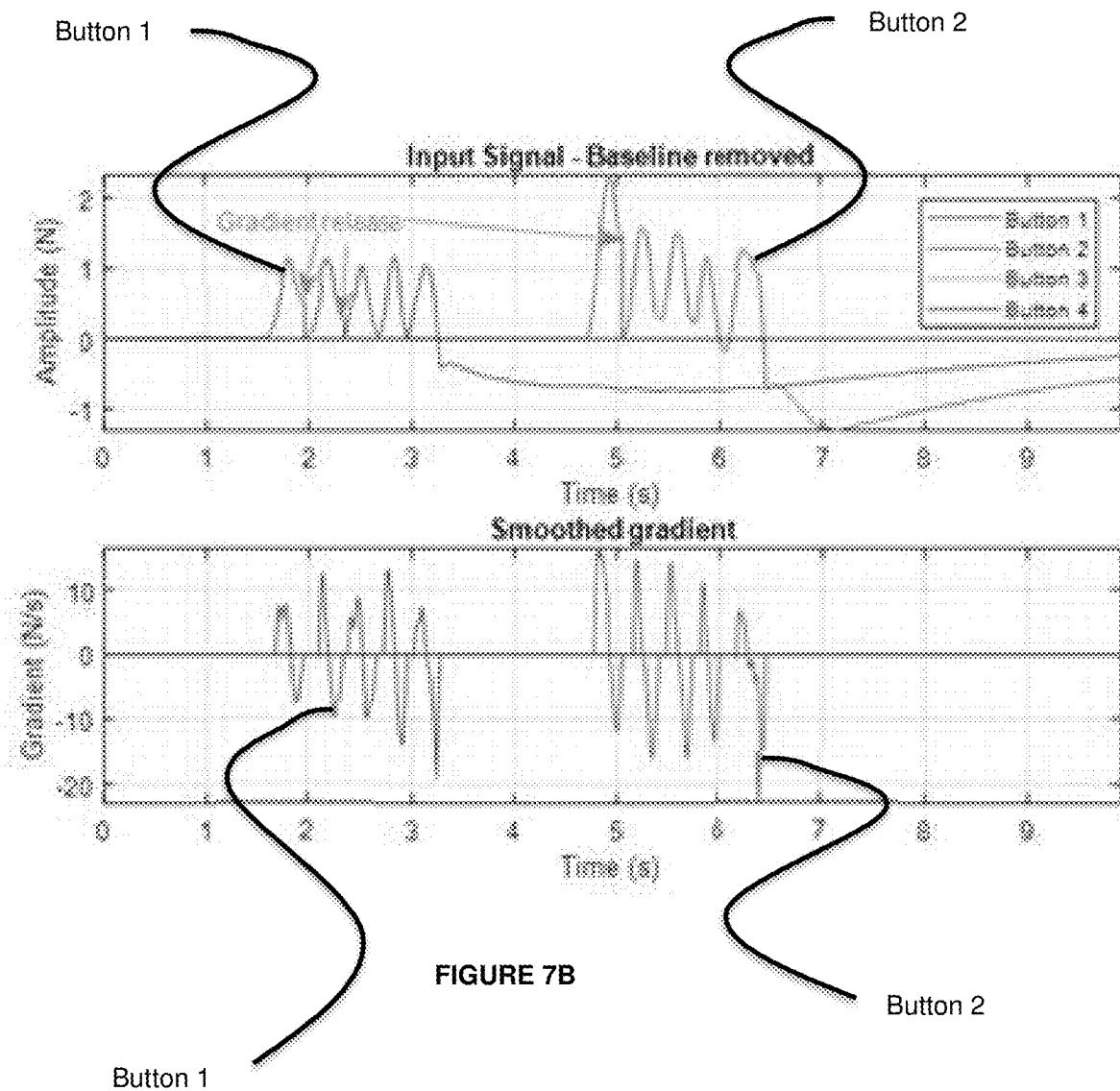
FIG. 7B presents graphs showing example outputs of a resistive force sensor system, useful for understanding an application of the method of FIG. 7A.

FIG. 7B presents graphs showing example outputs of a resistive force sensor system, useful for understanding an application of the method of FIG. 7A.

The upper graph corresponds to the upper graph of FIG. 5, and the lower graph corresponds to the graph of FIG. 6.

Thus, the force sensor inputs (force input signals) over time are shown in the upper graph in respect of four (virtual) buttons for a series of user press events which occur in respect of two of those buttons. The lower graph shows the instantaneous gradient of the input signals shown in the upper graph, smoothed with a smoothing filter.

Unlike the graphs of FIGS. 5 and 6, however, the method of FIG. 7A has been applied. Otherwise, all of these graphs correspond to the same raw data (i.e. received from one or more force sensors). The indication "baseline removed" again indicates that there is no baseline trace present, in contrast for example to FIG. 2. However, it will be appreciated that although the baseline is being shifted as in FIG. 5, it is being corrected for by virtue of the method of FIG. 7A.

As indicated in the upper graph of FIG. 7B, at around the point where a release event is detected, a re-calibration has been triggered and the value of the force input signal concerned is re-calibrated to show a 0 N value (a step change down to 0 N can be seen).

This re-calibration could be applied only to the force input signal concerned (the one which has triggered the re-calibration) or could be applied to a plurality or all of the force input signals together.

Note that each "force input signal" represented in e.g. FIG. 7B represents the force on the button concerned, but the button may be implemented with multiple force sensors. Therefore, if the button is implemented with multiple force sensors (e.g. two force sensors) and it needs to be re-calibrated, then the raw sensor signals from the force sensors corresponding to the button may be re-calibrated. In general, it may be that two force sensors are used per one button (i.e. a 2:1 mapping of force sensors to buttons). That is, the signals per button (e.g. plotted in FIG. 7B) may be created by a weighted average of two raw sensor signals from the force sensors concerned.

The re-calibration can be seen to occur three times in FIG. 7B, and the difference between the upper graphs of FIGS. 5 and 7B is readily apparent in this respect.

A press dynamics method intended to address the issue mentioned earlier will now be considered. This method may be considered part of, an addition to, or an alternative of the gradient release threshold method.

In overview, it is proposed to analyze the dynamics of the force sensor signal, in particular by quadrant tracking of the first and second derivatives (i.e. velocity and acceleration), to detect a user press event. In this approach, presses and taps can be traceable regardless the bias of the signal (i.e. baseline tracking may not be needed, or at least not to the same degree of accuracy).

Here, the terms "velocity" and "acceleration" will be used for convenience (i.e. by analogy to position-based measures) to indicate the first and second derivatives of the force sensor signal (with respect to time), respectively.

Figure 8:
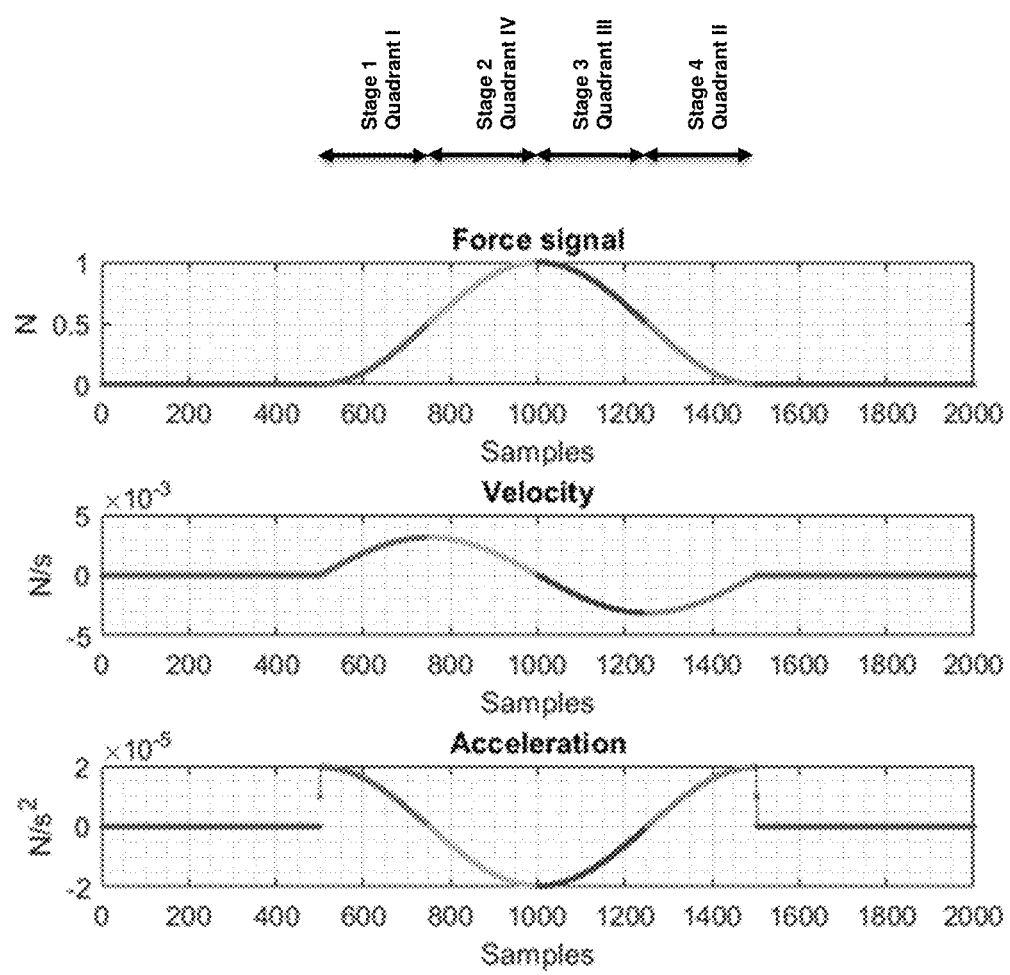
FIG. 8 presents graphs showing example outputs of a resistive force sensor system where a force input signal is generated by a force sensor subjected to a user press.

FIG. 8 presents graphs showing example outputs of a resistive force sensor system (force sensor solution), in particular where a force input signal (corresponding to the output signal in FIG. 2) is generated by a force sensor subjected to a user press.

The uppermost plot shows the force input signal over time. The force input signal is shown as an analogue signal expressed in N in line with FIG. 3. The middle plot shows the first derivative of the force input signal (indicated as "velocity"). The lowermost plot shows the second derivative of the force input signal (indicated as "acceleration").

Thus, a series of samples of a force signal from a force sensor are received, which provide the force profile of a user press as indicated in the top plot of FIG. 8. The first and second derivatives are calculated to provide the velocity and acceleration of the force profile.

The press signal is plotted to indicate the 4 different stages happening in a press:

1. The first section (first stage) of the press is indicated as Stage 1 (Quadrant I). It represents when the signal goes from minimum absolute velocity to the maximum velocity with the acceleration moving from the maximum to zero.

2. The second section (second stage) of the press is indicated as Stage 2 (Quadrant IV). This section displays the signal going from maximum velocity to zero and consequently the acceleration moving to the minimum value.

3. The third section (third stage) of the press is indicated as Stage 3 (Quadrant III). In here, the velocity is going negative as a consequence of reducing the force level and the acceleration is approaching zero.

4. The fourth section (fourth stage) of the press is indicated as Stage 4 (Quadrant II). This is the last section where the minimum velocity approaches zero and the acceleration is positive.

It will be understood that analyzing the velocity and acceleration of the force sensor signal is independent of the initial bias level, and accordingly such analysis will not be negatively impacted by a changed bias level, e.g. due to temperature changes.

Figure 9:
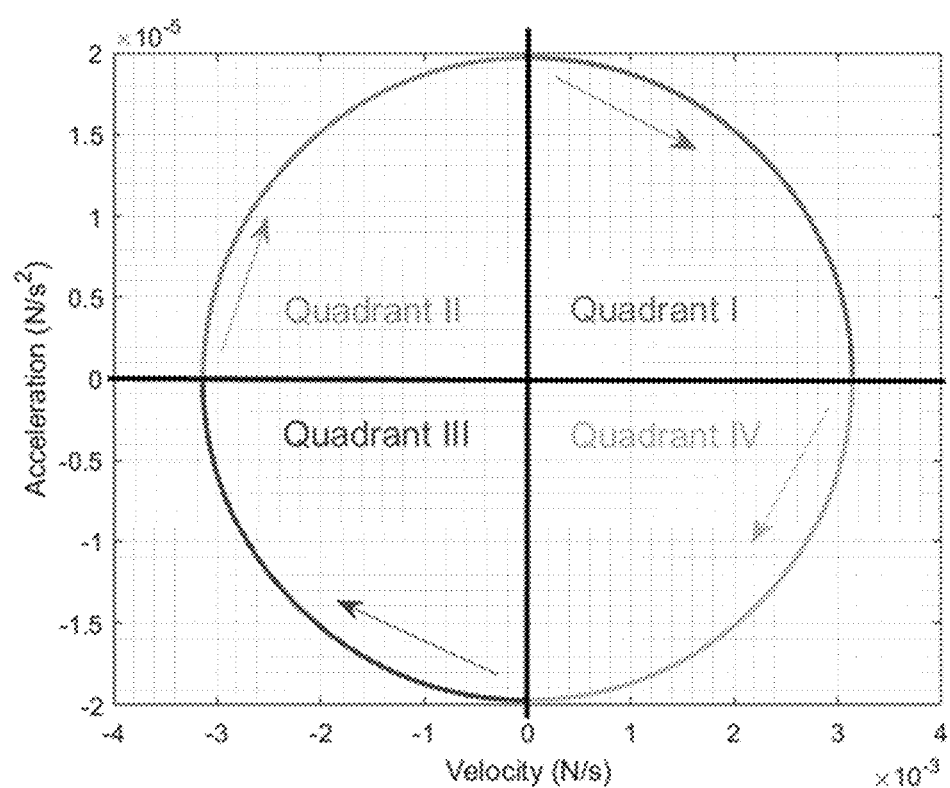
FIG. 9 is a graph showing acceleration and velocity signals of FIG. 8 plotted against one another.

FIG. 9 is a graph showing the acceleration (N/s$^2$) and velocity (N/s) signals of FIG. 8 plotted against one another. That is, the velocity and acceleration can be projected onto a 2D representation, to define a quadrant tracking method to determine that a valid user press event has occurred.

In particular, the proposed method tracks the velocity and acceleration to confirm that the sensor signal actually moves through the four different states (corresponding to the four stages mentioned above) consecutively and in the correct order. For a valid user press event to have occurred, the system is configured to confirm that the combined velocity and acceleration points go from Quadrant I (Stage 1) to Quadrant IV (Stage 2); and then from Quadrant IV (Stage 2) to Quadrant III (Stage 3); and finally from Quadrant III (Stage 3) to Quadrant II (Stage 4). If such a sequence is followed, accordingly a user press event is triggered.

In some instances, it may be acceptable to confirm that the combined velocity and acceleration points go through fewer (i.e. a subset of the) stages. For example, from Quadrant IV (Stage 2) to Quadrant III (Stage 3), or from Quadrant I (Stage 1) to Quadrant II (Stage 4), or from Quadrant I (Stage 1) to Quadrant IV (Stage 2) to Quadrant II (Stage 4). It will be understood that the present disclosure extends to confirming progression through any subset of the sequence depicted in FIGS. 8 and 9 (e.g. omitting one or two Stages may be acceptable).

Of course, it is not necessary to actually generate such a 2D representation in order to perform quadrant tacking; the graph of FIG. 9 is simply helpful for understanding the concept. Pairs of corresponding velocity and acceleration values (which if plotted on the 2D representation of FIG. 9 based on the FIG. 8 force input signal would generate the plot of FIG. 9) could be tested against ranges of values which define the quadrants to determine in which quadrant any such pair is. Further, the force input signal of FIG. 8 is an example which gives a convenient circle plot in FIG. 9. In a practical implementation, however, a force input signal would be unlikely to give a true circle plot as in FIG. 9.

Figure 10:
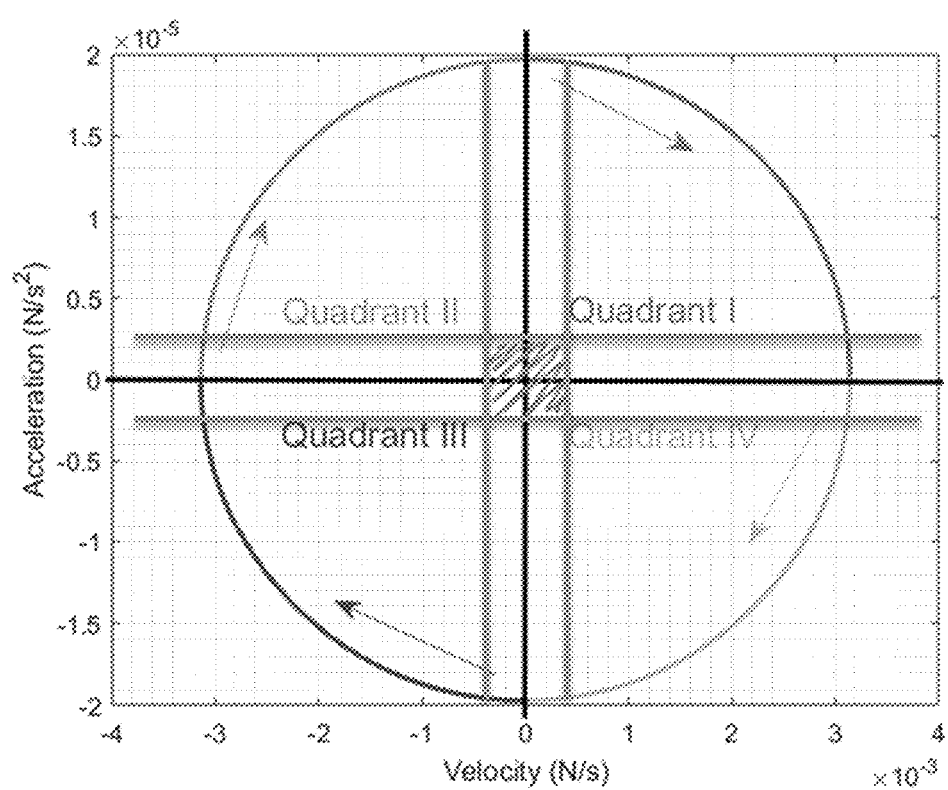
FIG. 10 is a graph corresponding to that of FIG. 9 but showing the concept of a "noise box"

FIG. 10 is a graph corresponding to that of FIG. 9 but showing the concept of a "noise box". In a further aspect, the system may define a "noise box", as illustrated by a rectangle (square) in FIG. 10, having velocity of between +/−0.4 N/s and acceleration of between +/−0.25 N/s$^2$, by way of example. A force sensor signal (force input signal) having a velocity and acceleration falling within the noise box can be assumed to be noise, with anything falling outside of the noise box assumed to be part of a force event.

While the noise box is illustrated as a rectangle centered at (0,0) in FIG. 10, it will be understood that other geometries may be used, e.g. an ellipse or an irregular shape. Furthermore, it will be understood that the noise box may or may not be centered at (0,0), and the dimensions or boundaries of the noise box may be varied dependent on the system characteristics.

Further, it will be understood that although in the example of FIG. 10 the dimensions of velocity of between +/−0.4 N/s and acceleration of between +/−0.25 N/s$^2$ define the square in the centre (indicated as being excluded), it may be that a force sensor signal (force input signal) having a velocity of between +/−0.4 N/s or (rather than and) an acceleration of between +/−0.25 N/s$^2$ is taken to be noise. In this case, the "noise box" may be defined as a cross shape (as also apparent from FIG. 10, with the square at its centre) which, in this example, is also defined by the dimensions of velocity of between +/−0.4 N/s and acceleration of between +/−0.25 N/s$^2$. Thus, a force sensor signal (force input signal) having a velocity and acceleration falling within the (cross-shaped) noise box may be assumed to be noise, with anything falling outside of the noise box assumed to be part of a force event.

In addition, it will be understood that the boundaries of the "noise box" can be dynamically calculated or estimated using a recursive averaging technique as an alternative to using fixed thresholds. In such a situation, the definition of the noise box may be unsupervised in the sense that it may be applied on the voltage domain (without using any sensitivity value knowledge) and without setting any threshold.

Figure 11:
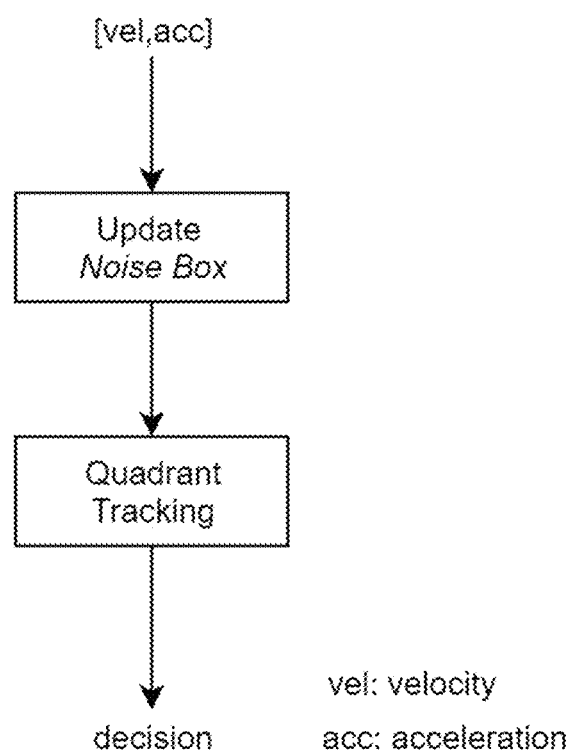
FIG. 11 is a schematic diagram of a control method which could be operated by the force sensor system to determine when a press event has occurred.

FIG. 11 is a schematic diagram of a control method which could be operated by the force sensor system (or the device 102 having that system) to determine when a press event has occurred.

With reference to FIG. 11, for each new force sample, the first and second derivatives are calculated, to determine the velocity and acceleration values. The noise box is then updated with the new samples. A quadrant tracking method is applied to check that the samples follow the quadrant sequence that indicates a user press event has occurred, i.e. the samples move in succession through Quadrant I to Quadrant IV, from IV to III and finally from III to II. If the sequence is followed, then the system can determine that a user press event has occurred. If the sequence is not followed, then the system can determine that an error has occurred, or an anomalous output from the force sensor system has occurred.

This method allows for the unsupervised detection of force events, and in addition is configured to be independent of incorrect sensitivity estimates.

FIGS. 12A to 12D are graphs depicting stages in an example implementation of the control method of FIG. 11.

Each of FIGS. 12A to 12D comprises an upper and lower plot. In the upper plot an example force input signal is shown over time. The force input signal is shown as an analogue signal expressed in N in line with FIG. 3. The lower plot shows the corresponding acceleration (N/s$^2$) and velocity (N/s) signals plotted against one another, but with plots being made at discrete sample times (rather than continuously as in the upper plot). Thus, the lower plot appears as a succession of separate sample points (dots), each sample point representing a pair of acceleration and velocity values for a corresponding sample point in the upper plot. Also shown in the lower plot is a noise box, with sample points within the box effectively being ignored when determining whether a press has been detected.

FIGS. 12A to 12D correspond to four snapshots of the process of completing the plots, in time order. To help in a comparison between FIGS. 12A to 12D, the complete force input signal is shown faintly in all four of those Figures as if the process of completing the plots had been carried out for the full 4.5 seconds. Five press events can be identified. In each of FIGS. 12A to 12D, however, the relevant portion of the force input signal which has been plotted so far is shown emboldened.

Figure 12A:
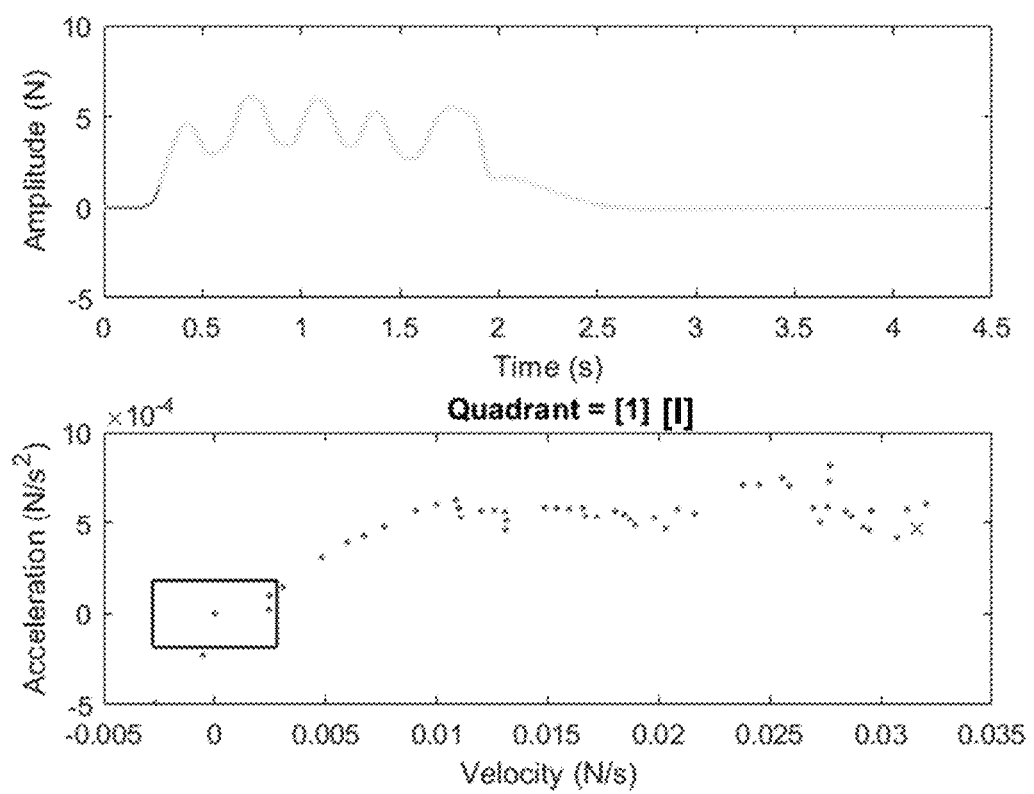
FIGS. 12A to 12D are graphs depicting stages in an example implementation of the control method of FIG. 11.

Thus, starting with FIG. 12A, the plotting has reached the early stages of the first press event. In the lower plot the sample points have progressed from within the noise box diagonally upwards within Quadrant I, with the current sample point of the snapshot indicated as a cross. Above, the lower plot it is indicated that movement into Quadrant I has been detected (the number 1 is also used to indicate the corresponding stage).

Figure 12B:
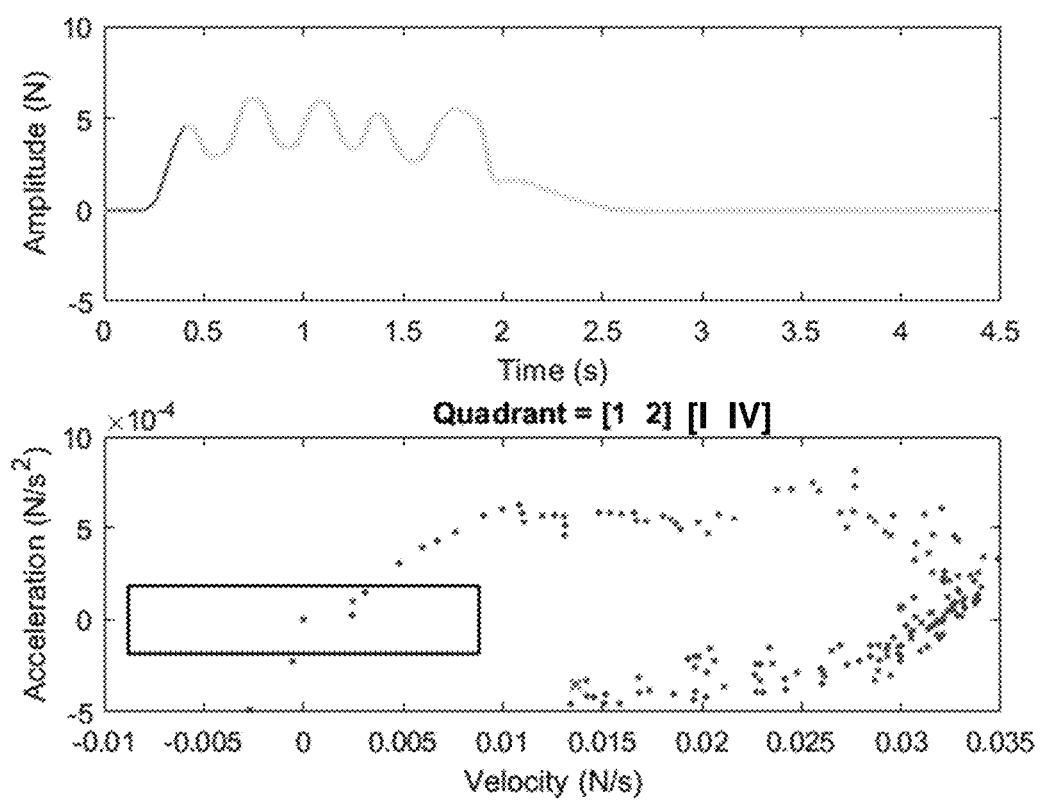

Moving on to FIG. 12B, the plotting has reached near the peak of the first press event. In the lower plot the sample points have progressed downwards and into Quadrant IV, with the current sample point of the snapshot indicated as a cross. Above the lower plot it is indicated that the progression from Quadrant I to IV has been detected (the numbers 1 and 2 are also used to indicate the corresponding stages). Note also that the noise box has been updated adaptively, based on the velocity and acceleration values (or the force input signal), in line with FIG. 11. Further, although the noise box is shown as a rectangle, the present implementation has operated based on the cross-shaped noise box principle explained in connection with FIG. 10, where the indicated rectangle forms the centre of the cross-shaped noise box. Thus, the sample points in the lower plot have had to progress to below the lower side of the indicated rectangle (i.e. out of the cross-shaped noise box or noise region) for the progression into Quadrant II to be recognised.

Figure 12C:
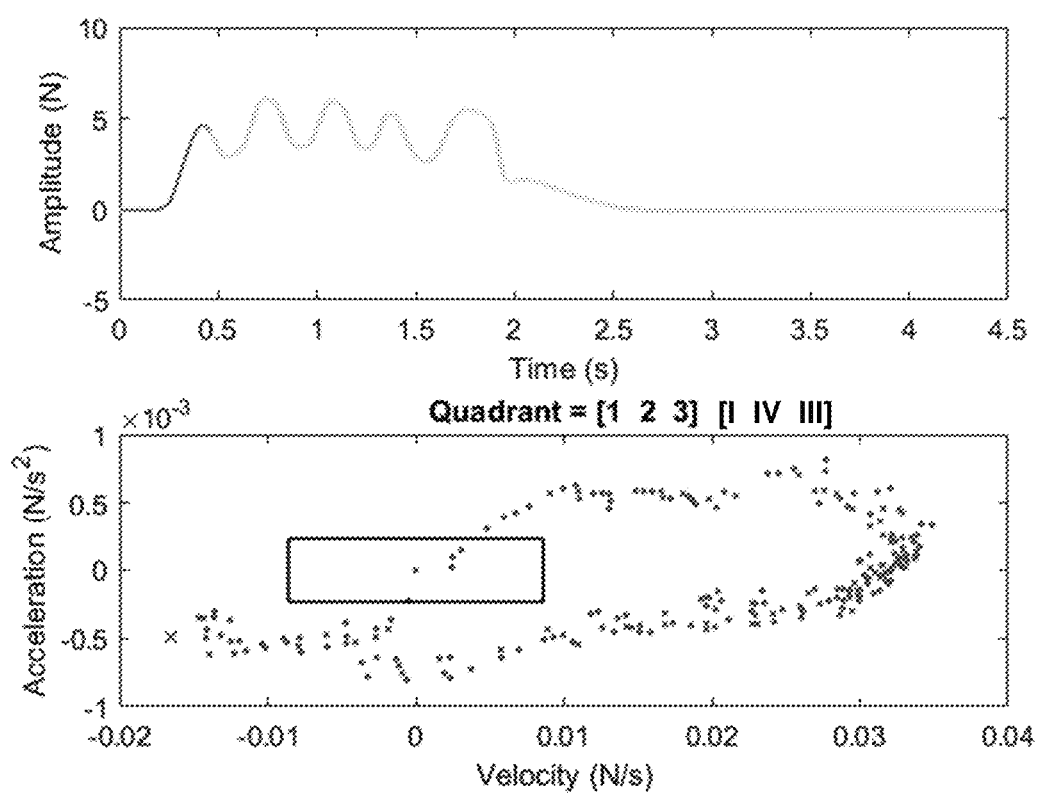

Moving on to FIG. 12C, the plotting has passed beyond the peak of the first press event and the detected force is reducing. In the lower plot the sample points have progressed to the left and into Quadrant III, with the current sample point of the snapshot indicated as a cross. Above the lower plot it is indicated that the progression from Quadrant I, to Quadrant IV and then Quadrant III has been detected (the numbers 1, 2 and 3 are also used to indicate the corresponding stages). The noise box has been updated adaptively by a small amount, based on the velocity and acceleration values (or the force input signal), in line with FIG. 11. The sample points in the lower plot have had to progress to leftward of the left-hand side of the indicated rectangle for the progression into Quadrant III to be recognised.

Figure 12D:
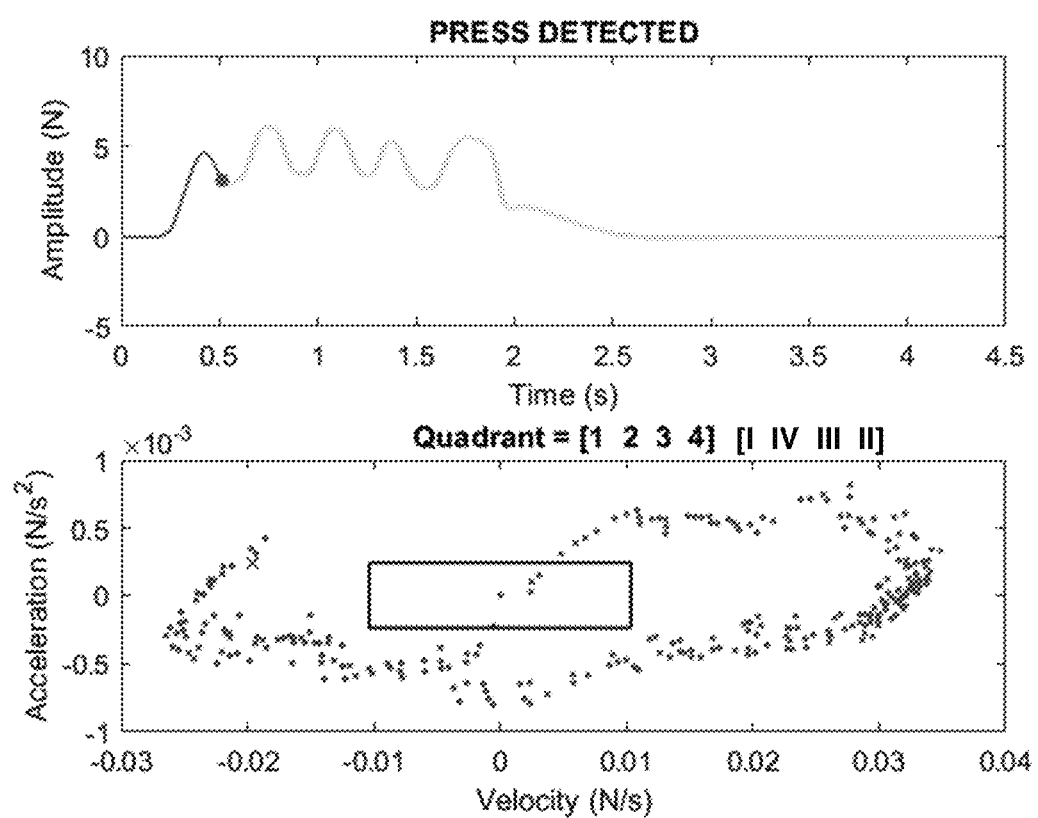

Finally, moving on to FIG. 12D, the plotting has passed towards the end of the first press event. In the lower plot the sample points have progressed upwards and into Quadrant II, with the current sample point of the snapshot indicated as a cross. Above the lower plot it is indicated that the progression from Quadrant I, to Quadrant IV, to Quadrant III and then Quadrant II has been detected (the numbers 1, 2, 3 and 4 are also used to indicate the corresponding stages). The noise box has been updated adaptively again by a small amount, based on the velocity and acceleration values (or the force input signal), in line with FIG. 11. The sample points in the lower plot have had to progress to above the upper side of the indicated rectangle for the progression into Quadrant II to be recognised.

With the progression through Quadrants I, IV, III and II (stages 1, 2, 3 and 4) in that order detected, it has been determined that a user press has been detected, and this is indicated above the upper plot in FIG. 12D, and by a dot marked onto the current sample point in the upper plot itself.

Merely as an example, one possible mechanism or algorithm for adaptively updating the size of the noise box is to define the dimensions of the rectangle (e.g. as depicted in FIGS. 12A to 12D) so that the rectangle has its width extending from $-(\text{vel\_th}[n]*\text{headroom\_vel})$ to $+(\text{vel\_th}[n]*\text{headroom\_vel})$, and its height extending from $-(\text{acc\_th}[n]*\text{headroom\_acc})$ to $+(\text{acc\_th}[n]*\text{headroom\_acc})$, where headroom_vel and headroom_acc are chosen velocity and acceleration parameters (which could be constants), and where:

$$\text{vel}[n]=x[n]-x[n-1]$$

$$\text{acc}[n]=\text{vel}[n]-\text{vel}[n-1]$$

$$\text{vel\_th}[n]=\text{vel\_th}[n-1]\lambda+(1-\lambda)(\text{abs}(\text{vel}[n]))$$

$$\text{acc\_th}[n]=\text{acc\_th}[n-1]\lambda+(1-\lambda)(\text{abs}(\text{acc}[n]))$$

where n is the sample number, x[n] is the value of the force input signal x at sample n, vel[n] and acc[n] are the first and second derivatives of the signal x at sample n respectively used to determine the size of the rectangle, abs indicates the absolute value, and $\lambda$ is a forgetting factor. Of course, other adaptive, recursive methods will be known to the skilled person.

It will be understood that the above-described gradient release threshold method and the press dynamics method may be independently used in a force sensor system or may be used in combination to determine the occurrence of user press events in the system. It will be further understood that either or both of the methods may be used in combination with other force sensor methods, e.g. based on fixed or adaptive thresholds.

In a preferred aspect, the above-described methods are used when the temperature of the force sensor system exceeds a temperature threshold, e.g. above 50 degrees Celsius. As a result, the force sensor system may be arranged to receive a temperature input, e.g. from a temperature sensor provided in the device 102, to control the operation of the various methods. For temperatures below such a threshold, standard force sensor methods may be used, but for temperatures above such a threshold the use of one or both of the above methods can prevent the processing of incorrect inputs. It will be understood that standard force sensor methods, e.g. using fixed or adaptive thresholds, may continue to be used for temperatures above the temperature threshold.

It will be understood that the above-described methods may be implemented in a dedicated control module, for example a processing module or DSP. The control module may be provided as an integral part of the force sensor system or may be provided as part of a centralized controller such as a central processing unit (CPU) or applications processor (AP). It will be understood that the control module may be provided with a suitable memory storage module for storing measured and calculated data for use in the described processes.

The skilled person will recognise that some aspects of the above described apparatus (circuitry) and methods may be embodied as processor control code (e.g. a computer program), for example on a non-volatile carrier medium such as a disk, CD- or DVD-ROM, programmed memory such as read only memory (Firmware), or on a data carrier such as an optical or electrical signal carrier.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, a headphone or earphone, or a mobile telephone for example a smartphone. It will be understood that embodiments may be implemented as part of any suitable human-machine interface system, for example on a home appliance or in a vehicle or interactive display. There is further provided a host device incorporating the above-described system.

There is further provided a control method for a sensor system as described above.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element. It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

Further embodiments likewise, with the benefit of this disclosure, will be apparent to those having ordinary skill in the art, and such embodiments should be deemed as being encompassed herein.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Aspects of the system may be defined by the following numbered statements:

1. There is provided a control method for a force sensor system used to define at least one virtual button, the control method comprising the steps of:
   receiving a force sensor input;
   determining a gradient of the force sensor input; and
   comparing the determined gradient to a gradient threshold to determine a user press event of a virtual button.

2. Preferably, the method comprises the step of comparing the determined gradient to a falling gradient threshold to determine a release event of a virtual button.

3. In one aspect, the falling gradient threshold is selected based on characteristic properties of a device having the force sensor system, e.g. the stiffness of a chassis or frame of such a device. In a preferred aspect, the falling gradient threshold is set at approximately −5 N/s.

4. Additionally or alternatively, there is provided a first control method for a force sensor system used to define at least one virtual button, the control method comprising the steps of:
receiving a force sensor input;
determining a gradient of the force sensor input; and
comparing the determined gradient to a first re-calibration threshold to determine a re-calibration requirement of the force sensor system.

5. Preferably, the first re-calibration threshold is a negative value. In a preferred aspect, the first re-calibration threshold is selected as the falling gradient threshold as described above. In one aspect, the first re-calibration threshold is set at approximately −5 N/s.

6. Preferably, responsive to a determination that a re-calibration is required, the method comprises the step of comparing the determined gradient to a second re-calibration threshold to trigger a re-calibration of the force sensor system.

7. Preferably, the second re-calibration threshold is set at a level higher than the first re-calibration threshold. Preferably, the second re-calibration threshold is approximately a zero value, e.g. 0 N/s. Alternatively, the second re-calibration threshold may be a positive value, or a negative value close to zero, e.g. −1 N/s.

As the second threshold is defined at a positive or zero value, accordingly the re-calibration of the system will be performed at the correct point for accurate system operation.

8. Preferably, the method comprises determining a smoothed gradient of the force sensor input, preferably by performing a low pass filtering of the gradient signal, wherein the steps of comparing are performed using the smoothed gradient.

Providing a smoothed gradient removes high-frequency noise from the gradient signal, to allow for more accurate comparison of the gradient to the relevant thresholds.

9. Additionally or alternatively, there is provided a second control method for a force sensor system used to define at least one virtual button, the control method comprising the steps of:
receiving a force sensor input;
determining first and second derivatives of the force sensor input to provide velocity and acceleration values;
mapping the velocity and acceleration values to a 2D representation; and
performing quadrant tracking or state space tracking of the 2D representation of the velocity and acceleration values to determine if a user press event has occurred.

10. Preferably, the method comprises the step of determining a user press event has occurred if the quadrant tracking follows a defined sequence.

11. Preferably, the method comprises the step of determining a user press event has occurred if the velocity and acceleration values sequentially progress through first, second, third and fourth stages, wherein the stages are defined as follows:
First stage: positive velocity, positive acceleration;
Second stage: positive velocity, negative acceleration;
Third stage: negative velocity, negative acceleration; and
Fourth stage: negative velocity, positive acceleration.

12. Preferably, the method comprises the step of defining a noise box as part of a 2D representation, wherein a force sensor input having velocity and acceleration values falling outside of the noise box is assumed to be part of a user press event.

13. Preferably, the noise box is defined as a space at the center of the 2D representation.

14. Preferably, the noise box is centered at (0,0) of the 2D representation.

15. In one aspect, the noise box is defined as a rectangle having a velocity value of between +/−0.4 N/s and an acceleration value of between +/−0.25 N/s2. Alternatively, the noise box is dynamically calculated.

16. In an alternative aspect, the noise box is defined as an alternative shape, e.g. an ellipse.

17. In one aspect, the above-described control methods are performed together in a force sensor system.

18. Preferably, at least one of the above-described control methods comprise:
receiving a temperature level of a force sensor system; and
performing the control method when the temperature level is above a temperature threshold.

19. Preferably, the temperature threshold is approximately 50 degrees Celsius.

20. The temperature threshold may be received from a temperature sensor provided at the force sensor system, or may be received from a temperature sensor of a device comprising such a force sensor system.

21. Preferably, the above-described control methods are performed in combination with an alternative force sensor control method to determine user touch events, e.g. a force sensor control method using absolute or adaptive thresholds.

22. There is further provided a force sensor system comprising at least one force sensor and a controller arranged to implement at least one of the above-described control methods.

23. Preferably, the at least one force sensor comprises one or more of the following:
a capacitive displacement sensor,
an inductive force sensor,
a strain gauge,
a piezoelectric force sensor,
a force sensing resistor,
a piezoresistive force sensor,
a thin film force sensor, and
a quantum tunneling composite-based force sensor.

24. There is provided a host device comprising a force sensor system as described above.

Aspects of the present disclosure may also be defined by the following numbered statements:

S1. A method of controlling a force sensor system to define at least one button implemented by at least one force sensor, the method comprising:
receiving a force sensor input;
determining a gradient of the force sensor input; and
controlling the force sensor system based on the determined gradient.

S2. The method according to statement S1, wherein:
the force sensor input is received from the at least one force sensor; and/or
the at least one button is a virtual button, optionally defined at a location on a device other than a location on the device of said at least one force sensor.

S3. The method according to statement S1 or S2, wherein said gradient is:
a gradient with respect to time; and/or
a first derivative with respect to time; and/or
a first time derivative.

S4. The method according to any of the preceding statements, wherein the control comprises comparing the determined gradient to:
- a press-event gradient threshold to determine a user press event of the at least one button; and/or
- a falling gradient threshold to determine a release event of the at least one button; and/or
- a first re-calibration threshold to determine a re-calibration requirement of the force sensor system.

S5. The method according to statement S4, wherein at least one of the press-event gradient threshold, the falling gradient threshold and the first re-calibration threshold is a negative gradient threshold or has a negative value, and is optionally set at a value corresponding to a detected rate of change of force with respect to time of approximately −5 N/s.

S6. The method according to statement S4 or S5, wherein at least one of the press-event gradient threshold, the falling gradient threshold and the first re-calibration threshold is based on characteristic properties of a device having the force sensor system, such as the stiffness of a chassis or frame of the device.

S7. The method according to any of statements S4 to S6, wherein the press-event gradient threshold, the falling gradient threshold and the first re-calibration threshold, or at least two of those thresholds, are the same as one another.

S8. The method according to any of statements S4 to S7, wherein the method comprises comparing the determined gradient to a second re-calibration threshold to trigger a re-calibration of the force sensor system.

S9. The method according to statement S8, wherein a value of the second re-calibration threshold is set at a level higher than, or more positive than, that of the first re-calibration threshold.

S10. The method according to statement S8 or S9, wherein:
- the second re-calibration threshold has a value corresponding to a detected rate of change of force with respect to time of approximately 0 N/s; or
- the second re-calibration threshold has a positive value or a negative value corresponding to a detected rate of change of force with respect to time of close to 0 N/s, such as 1 N/s or −1 N/s.

S11. The method according to any of statements S8 to S10, wherein the method comprises triggering the re-calibration if the determined gradient crosses the first re-calibration threshold and the second re-calibration threshold, optionally in that order.

S12. The method according to any of the preceding statements, wherein:
- the determining a gradient of the force sensor input comprises determining a smoothed gradient of the force sensor input, preferably by determining an un-smoothed gradient of the force sensor input and performing a low-pass filtering of the un-smoothed gradient; and
- the comparing is performed using the smoothed gradient.

S13. The method according to any of the preceding statements, comprising:
- determining first derivatives and second derivatives of the force sensor input to provide corresponding first-derivative values and second-derivative values; and
- controlling the force sensor system based on the first-derivative values and the second-derivative values.

S14. The method according to statement S13, wherein:
- each said derivative is a derivative with respect to time, or a time derivative; and/or
- the second derivative is a rate of change of the first derivative with respect to time; and/or
- the first derivative is a first-order derivative and the second derivate is a second-order derivative.

S15. The method according to statement S13 or S14, comprising:
- comparing the first-derivative values and the second-derivative values to threshold values to control the force sensor system.

S16. The method according to any of statements S13 to S15, comprising:
- comparing the first-derivative values and the second-derivative values to threshold values to determine if a user press event has occurred and/or to determine a re-calibration requirement of the force sensor system.

S17. The method according to any of statements S13 to 16, wherein the first-derivative values and the second-derivative values are determined as successive pairs of (instantaneous) derivative values, each pair comprising a first-derivative value and a second-derivative value corresponding to a given value of the force sensor input or to a given point in time.

S18. The method according to statement S17, comprising:
- mapping the pairs of derivative values to a 2D representation; and
- performing quadrant tracking or state space tracking with respect to the 2D representation of the successive pairs of derivative values to determine if a user press event has occurred.

S19. The method according to statement S18, wherein the 2D representation comprises a plot of first-derivative values against second-derivative values, or vice versa.

S20. The method according to statement S18 or S19, wherein the method comprises determining a user press event has occurred if the quadrant tracking or state space tracking follows a defined sequence.

S21. The method according to any of statements S18 to S20, wherein the method comprises defining a noise box as part of the 2D representation,
and wherein:
- a force sensor input having first-derivative values and second-derivative values falling outside of the noise box is subjected to the quadrant tracking or state space tracking to determine if the user press event has occurred; and/or
- pairs of derivative values falling inside the noise box are excluded from the quadrant tracking or state space tracking.

S22. The method according to statement S21, wherein the noise box is defined as a space at the centre of the 2D representation.

S23. The method according to statement S21 or S22, wherein, the noise box is centred at (0,0) or an origin of the 2D representation.

S24. The method according to any of statements S21 to S23, wherein the noise box is defined as a rectangle, optionally having a first-derivative value of between +/−0.4 N/s and a second-derivative value of between +/−0.25 N/s2.

S25. The method according to any of statements S21 to S24, wherein the noise box is dynamically calculated.

S26. The method according to any of statements S21 to S25, wherein the noise box is defined as a noise shape, such as an ellipse or cross.

S27. The method according to any of statements S17 to S26, wherein the method comprises determining that a user press event has occurred if the successive pairs of first-derivative and second-derivative values sequentially progress through first, second, third and fourth stages (in that order), wherein the stages are defined as follows:
  first stage: positive first-derivative value, positive second-derivative value;
  second stage: positive first-derivative value, negative second-derivative value;
  third stage: negative first-derivative value, negative second-derivative value; and
  fourth stage: negative first-derivative value, positive second-derivative value.

S28. The method according to any of statements S17 to S27, wherein the method comprises defining a first-derivative noise range as a range of first-derivative values attributable to noise, and excluding a pair of first-derivative and second-derivative values from determining a user press event has occurred if the first-derivative value of that pair is within the first-derivative noise range.

S29. The method according to statement S28, wherein the method comprises updating the first-derivative noise range dynamically, optionally based on preceding first-derivative values.

S30. The method according to any of statements S17 to S29, wherein the method comprises defining a second-derivative noise range as a range of second-derivative values attributable to noise, and excluding a pair of first-derivative and second-derivative values from determining a user press event has occurred if the second-derivative value of that pair is within the second-derivative noise range.

S31. The method according to statement S30, wherein the method comprises updating the second-derivative noise range dynamically, optionally based on preceding second-derivative values.

S32. The method according to any of statements S17 to S31, wherein the method comprises defining a noise space as a space defined by pairs of first-derivative and second-derivative values attributable to noise, and excluding a pair of first-derivative and second-derivative values from determining a user press event has occurred if that pair of first-derivative and second-derivative values falls within the noise space.

S33. The method according to statement S32, wherein the method comprises updating the noise space dynamically, optionally based on preceding first-derivative values, second-derivative values and/or pairs of first-derivative and second-derivative values.

S34. The method according to any of the preceding statements, comprising:
  receiving a temperature level of the force sensor system; and
  performing the method (e.g. only) when the temperature level is above a temperature threshold,
  optionally comprising determining whether the temperature level is above the temperature threshold.

S35. The method according to statement S34, wherein the temperature threshold is approximately 50 degrees Celsius.

S36. The method according to statement S34 or S35, wherein the temperature level is received from a temperature sensor of the force sensor system, or from a temperature sensor of a device comprising the force sensor system.

S37. The method according to any of statements S34 to S36, comprising:
  performing said determining and controlling when the temperature level is above the temperature threshold; and
  controlling the force sensor system without using a gradient of the force sensor input, or without performing said determining, when the temperature level is not above the temperature threshold.

S38. A force sensor system, comprising:
  at least one force sensor; and
  a controller connected to the at least one force sensor and configured to carry out the method of any of the preceding statements.

S39. The force sensor system according to statement S38, wherein the at least one force sensor comprises one or more of the following:
  a capacitive displacement sensor,
  an inductive force sensor,
  a strain gauge,
  a piezoelectric force sensor,
  a force sensing resistor,
  a piezoresistive force sensor,
  a thin film force sensor, and
  a quantum tunneling composite-based force sensor.

S40. A host device comprising the force sensor system according to statement S38 or S39.

The invention claimed is:

1. A method of controlling a force sensor system to define at least one button implemented by at least one force sensor, the method comprising:
  receiving a force sensor input;
  determining a gradient of the force sensor input; and
  controlling the force sensor system based on the determined gradient;
wherein the method comprises:
  comparing the determined gradient to a first re-calibration threshold and a second re-calibration threshold, wherein the first re-calibration threshold has a negative value and the second re-calibration threshold is set at a level higher than, or more positive than, that of the first re-calibration threshold; and
  triggering a re-calibration of the force sensor system if the determined gradient crosses the first re-calibration threshold and the second re-calibration threshold, in that order.

2. The method according to claim 1, wherein the control comprises comparing the determined gradient to:
  a press-event gradient threshold to determine a user press event of the at least one button; and/or
  a falling gradient threshold to determine a release event of the at least one button.

3. The method according to claim 2, wherein at least one of the press-event gradient threshold, and the falling gradient threshold is a negative gradient threshold or has a negative value.

4. The method according to claim 1, comprising:
  determining first derivatives and second derivatives of the force sensor input to provide corresponding first-derivative values and second-derivative values; and
  controlling the force sensor system based on the first-derivative values and the second-derivative values.

5. The method according to claim 4, comprising:
  comparing the first-derivative values and the second-derivative values to threshold values to control the force sensor system.

6. The method according to claim 4, comprising:
  comparing the first-derivative values and the second-derivative values to threshold values to determine if a user press event has occurred and/or to determine a re-calibration requirement of the force sensor system.

7. The method according to claim 4, wherein the first-derivative values and the second-derivative values are determined as successive pairs of derivative values, each pair comprising a first-derivative value and a second-derivative value corresponding to a given value of the force sensor input or to a given point in time.

8. The method according to claim 7, comprising:
   mapping the pairs of derivative values to a 2D representation; and
   performing quadrant tracking or state space tracking with respect to the 2D representation of the successive pairs of derivative values to determine if a user press event has occurred.

9. The method according to claim 8, wherein the method comprises defining a noise box as part of the 2D representation,
   and wherein:
      a force sensor input having first-derivative values and second-derivative values falling outside of the noise box is subjected to the quadrant tracking or state space tracking to determine if the user press event has occurred; and/or
      pairs of derivative values falling inside the noise box are excluded from the quadrant tracking or state space tracking.

10. The method according to claim 7, wherein the method comprises determining that a user press event has occurred if the successive pairs of first-derivative and second-derivative values sequentially progress through first, second, third and fourth stages, wherein the stages are defined as follows:
    first stage: positive first-derivative value, positive second-derivative value;
    second stage: positive first-derivative value, negative second-derivative value;
    third stage: negative first-derivative value, negative second-derivative value; and
    fourth stage: negative first-derivative value, positive second-derivative value.

11. The method according to claim 7, wherein the method comprises defining a first-derivative noise range as a range of first-derivative values attributable to noise, and excluding a pair of first-derivative and second-derivative values from determining a user press event has occurred if the first-derivative value of that pair is within the first-derivative noise range.

12. The method according to claim 7, wherein the method comprises defining a second-derivative noise range as a range of second-derivative values attributable to noise, and excluding a pair of first-derivative and second-derivative values from determining a user press event has occurred if the second-derivative value of that pair is within the second-derivative noise range.

13. The method according to claim 7, wherein the method comprises defining a noise space as a space defined by pairs of first-derivative and second-derivative values attributable to noise, and excluding a pair of first-derivative and second-derivative values from determining a user press event has occurred if that pair of first-derivative and second-derivative values falls within the noise space.

14. The method according to claim 1, comprising:
    receiving a temperature level of the force sensor system; and
    performing the method when the temperature level is above a temperature threshold.

15. The method according to claim 14, comprising:
    performing said determining and controlling when the temperature level is above the temperature threshold; and
    controlling the force sensor system without using a gradient of the force sensor input, or without performing said determining, when the temperature level is not above the temperature threshold.

16. A force sensor system such as a host device, comprising:
    at least one force sensor; and
    a controller connected to the at least one force sensor and configured to carry out a method of controlling the force sensor system to define at least one button implemented by the at least one force sensor, the method comprising:
        receiving a force sensor input;
        determining a gradient of the force sensor input; and
        controlling the force sensor system based on the determined gradient;
    wherein the method comprises:
        comparing the determined gradient to a first re-calibration threshold and a second re-calibration threshold, wherein the first re-calibration threshold has a negative value and the second re-calibration threshold is set at a level higher than, or more positive than, that of the first re-calibration threshold; and
        triggering a re-calibration of the force sensor system if the determined gradient crosses the first re-calibration threshold and the second re-calibration threshold, in that order.

17. A method of controlling a force sensor system to define at least one button implemented by at least one force sensor, the method comprising:
    receiving a force sensor input;
    determining a gradient of the force sensor input; and
    controlling the force sensor system based on the determined gradient,
    wherein the control comprises comparing the determined gradient to a falling gradient threshold, and detecting a release event of the at least one button when the gradient falls below the falling gradient threshold,
    wherein the falling gradient threshold is a negative gradient threshold or has a negative value.

18. The method according to claim 17, wherein the method comprises, once the release event has been detected, activating a baseline tracking system.

19. A force sensor system such as a host device, comprising:
    at least one force sensor; and
    a controller connected to the at least one force sensor and configured to carry out a method of controlling the force sensor system to define at least one button implemented by the at least one force sensor, the method comprising:
        receiving a force sensor input;
        determining a gradient of the force sensor input; and
        controlling the force sensor system based on the determined gradient;
    wherein the control comprises comparing the determined gradient to a falling gradient threshold, and detecting a release event of the at least one button when the gradient falls below the falling gradient threshold;
    wherein the falling gradient threshold is a negative gradient threshold or has a negative value.

* * * * *